(12) United States Patent
Zirin et al.

(10) Patent No.: US 8,492,951 B2
(45) Date of Patent: Jul. 23, 2013

(54) SEGMENTED STATOR ASSEMBLY

(75) Inventors: Robert Michael Zirin, Niskayuna, NY (US); Murtuza Lokhandwalla, Clifton Park, NY (US); Kiruba Sivasubramaniam Haran, Clifton Park, NY (US); Richard Nils Dawson, Voorheesville, NY (US); Mark John DeBlock, Peterborough (CA)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/916,258

(22) Filed: Oct. 29, 2010

(65) Prior Publication Data

US 2011/0266913 A1 Nov. 3, 2011

Related U.S. Application Data

(63) Continuation-in-part of application No. 12/871,276, filed on Aug. 30, 2010.

(51) Int. Cl.
*H02K 5/00* (2006.01)

(52) U.S. Cl.
USPC ...... 310/216.007; 310/216.008; 310/216.009; 310/216.051; 310/216.079; 310/216.098; 310/216.114

(58) Field of Classification Search
USPC .................... 310/216.004, 216.007–216.009, 310/216.016, 216.035, 216.049, 216.051, 310/216.057, 216.079, 216.091, 216.098, 310/216.102, 216.109, 216.114, 12.24
See application file for complete search history.

(56) References Cited

U.S. PATENT DOCUMENTS

| | | | | |
|---|---|---|---|---|
| 2,078,668 | A * | 4/1937 | Kilgore | 310/433 |
| 4,469,973 | A * | 9/1984 | Guyot et al. | 310/433 |
| 4,634,909 | A * | 1/1987 | Brem | 310/91 |
| 4,891,540 | A * | 1/1990 | Cooper et al. | 310/433 |
| 6,781,276 | B1 | 8/2004 | Stiesdal et al. | |
| 6,954,010 | B2 * | 10/2005 | Rippel et al. | 310/60 A |
| 2009/0134629 | A1 | 5/2009 | Stiesdal | |
| 2009/0140526 | A1 | 6/2009 | Jansen et al. | |
| 2009/0256431 | A1 | 10/2009 | Stiesdal | |

FOREIGN PATENT DOCUMENTS

| | | |
|---|---|---|
| WO | 03073591 A1 | 9/2003 |
| WO | 2006008331 A1 | 1/2006 |

\* cited by examiner

*Primary Examiner* — Dang Le
(74) *Attorney, Agent, or Firm* — Marie-Claire B. Maple

(57) ABSTRACT

A stator assembly includes a segmented stator having stator portions. Each stator portion includes a support structure and dovetails, each coupled to the support structure by adjustable elements. The stator portion also includes stator laminations, where each of the laminations has openings to engage with the dovetails. Connectors are provided to connect the stator portions of the segmented stator together.

9 Claims, 24 Drawing Sheets

US 8,492,951 B2

SEGMENTED STATOR ASSEMBLY

CROSS-REFERENCE TO RELATED APPLICATIONS

This application is a continuation-in-part of co-pending U.S. patent application Ser. No. 12/871,276, entitled "SEGMENTED STATOR ASSEMBLY," filed on Aug. 30, 2010.

BACKGROUND

Generators have been widely used in a variety of applications including aircraft, automobiles and turbines. Generators typically include a stator and a rotor that work together to produce electricity. Wind turbines have received increased attention recently as an environmentally safe alternative energy source. Wind turbines convert the kinetic energy of the wind into mechanical power and then the mechanical power drives the generator to produce electricity.

Offshore wind turbines typically have ratings of 3 MW and higher, necessitated by the economics of wind energy production. Also offshore turbines employ a direct drive generator to improve reliability, unlike most land based utility scale wind turbines that utilize a geared generator. These ratings and the fact that the generator is directly driven manifests into a very large size and weight. A machine greater than 4 m in diameter is difficult and costly to transport by conventional means and necessitates segmentation.

Alternatively, a 3 MW machine could be made within a 4 m diameter limit by making it axially longer or utilizing a double-sided configuration. Both of these options present challenges. An axially longer machine weighs significantly more than a shorter length larger diameter machine whereas a double-sided configuration presents significant manufacturing complexity. While the segmented stator structures facilitate cost and transport, particularly when designed to accommodate conventional rail or road shipping constraints, they are difficult to manufacture and assemble at site.

For these and other reasons, there is a need for the present invention.

SUMMARY

A stator assembly includes a segmented stator having stator portions. Each stator portion includes a support structure and dovetails, each coupled to the support structure by adjustable elements. The stator portion also includes stator laminations, where each of the laminations has openings to engage with the dovetails. Connectors are provided to connect the stator portions of the segmented stator together.

BRIEF DESCRIPTION OF THE DRAWINGS

The nature and various additional features of the invention will appear more fully upon consideration of the illustrative embodiments of the invention which are schematically set forth in the figures. Like reference numerals represent corresponding parts.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Embodiments of the present invention will be explained in further detail by making reference to the accompanying drawings, which do not limit the scope of the invention in any way.

Exemplary embodiments of the invention disclosed herein are shown in the context of a generator for a wind turbine. However, this is only an example for the purpose of description. It is to be understood that the stator assembly according to embodiments of the invention can be used in any generator for electric machines. In addition, the generator can be a direct drive generator or any other generator used for electric machines.

Figure 1:
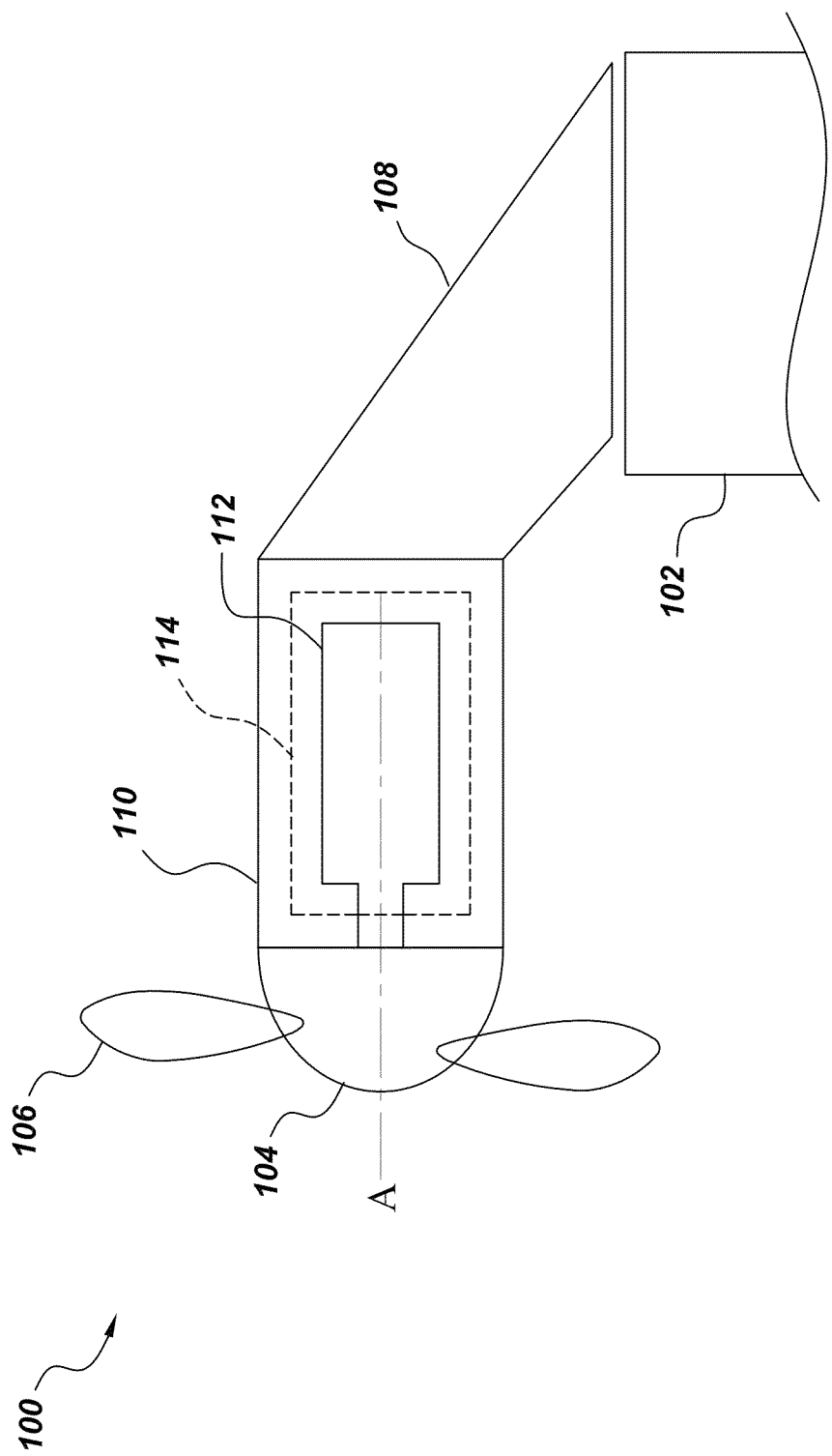
FIG. 1 illustrates a wind turbine having a stator assembly according to an exemplary embodiment of the invention.

FIG. 1 illustrates a wind turbine 100 arranged on a tower 102 having a hub 104 with blades 106. A generator 110 is provided on an extension 108 of the tower 102. The generator 110 includes a rotor assembly 112 and a stator assembly 114. An exemplary segmented stator assembly 114 is shown in more detail in FIGS. 2A and 2B. Although the example depicts the generator upstream of the tower 102, the generator location could be either upstream, downstream or on the tower, and the embodiments for stator segmentation discussed here apply to all such configurations.

Figure 2A:
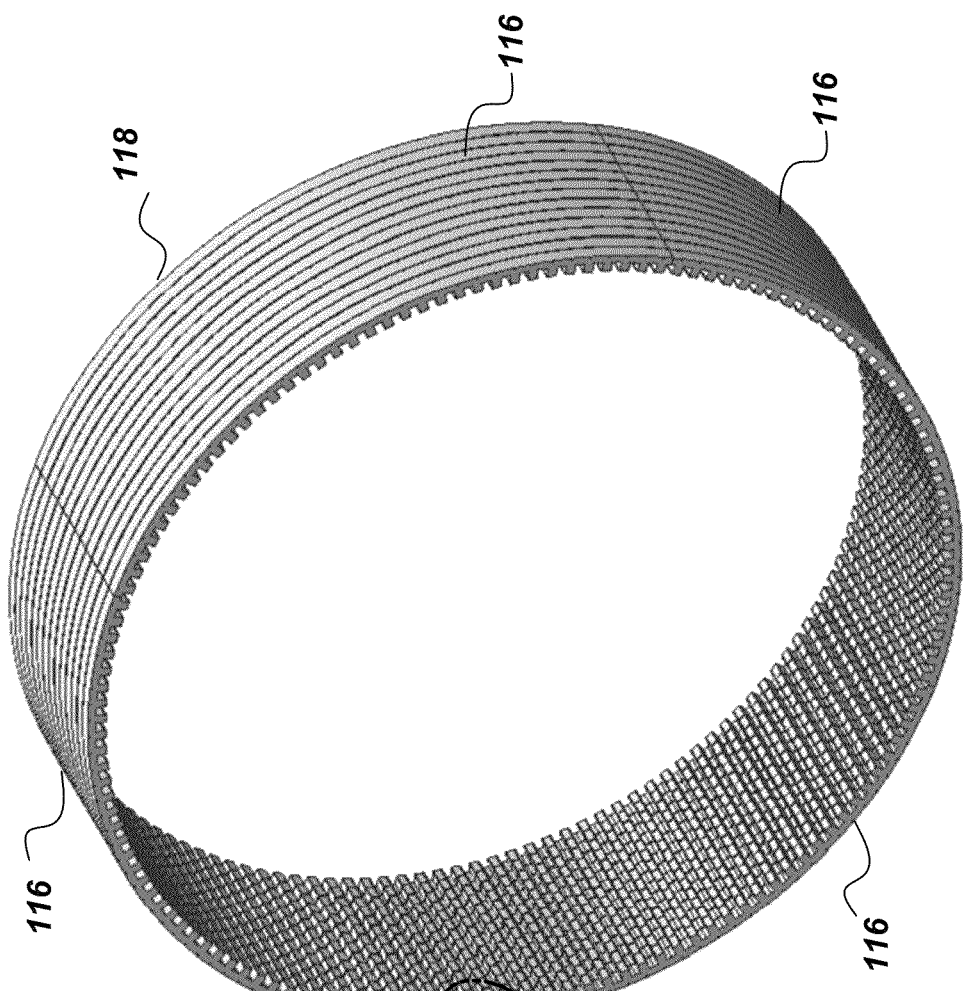
FIG. 2A illustrates a diagrammatic view of a stator assembly according to an exemplary embodiment of the present invention
Figure 2B:
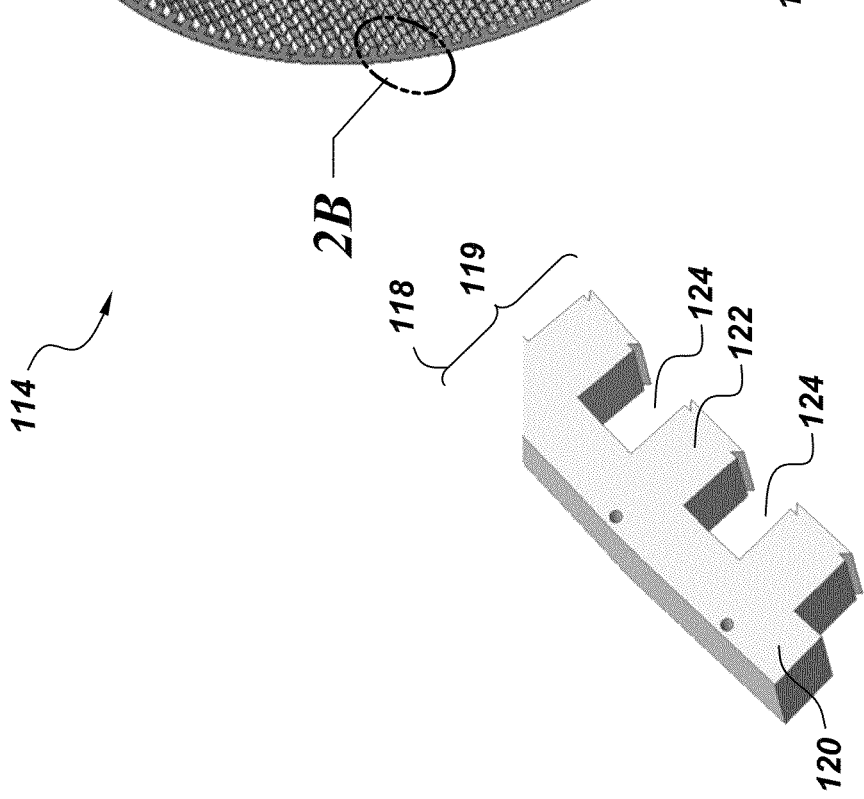
FIG. 2B illustrates a blown-up view of a portion of the stator assembly shown in FIG. 2A.

FIG. 2A illustrates a diagrammatic view of a segmented stator according to an exemplary embodiment of the invention. The segmented stator assembly 114 includes stator segments or portions 116 each having stator laminations 118. In the example illustrated, four stator segments are shown. However, it is to be understood that the invention is not limited in this regard and that there can be any number of stator segments. FIG. 2B is a blown-up view of portion 119 of the segmented stator 114, which shows that each stator segment 116 includes stator laminations 118 each having a yoke or back iron 120 and stator teeth 122 defining stator openings 124. The stator openings 124 are provided to accommodate windings 136 (shown in FIG. 4).

Figure 3A:
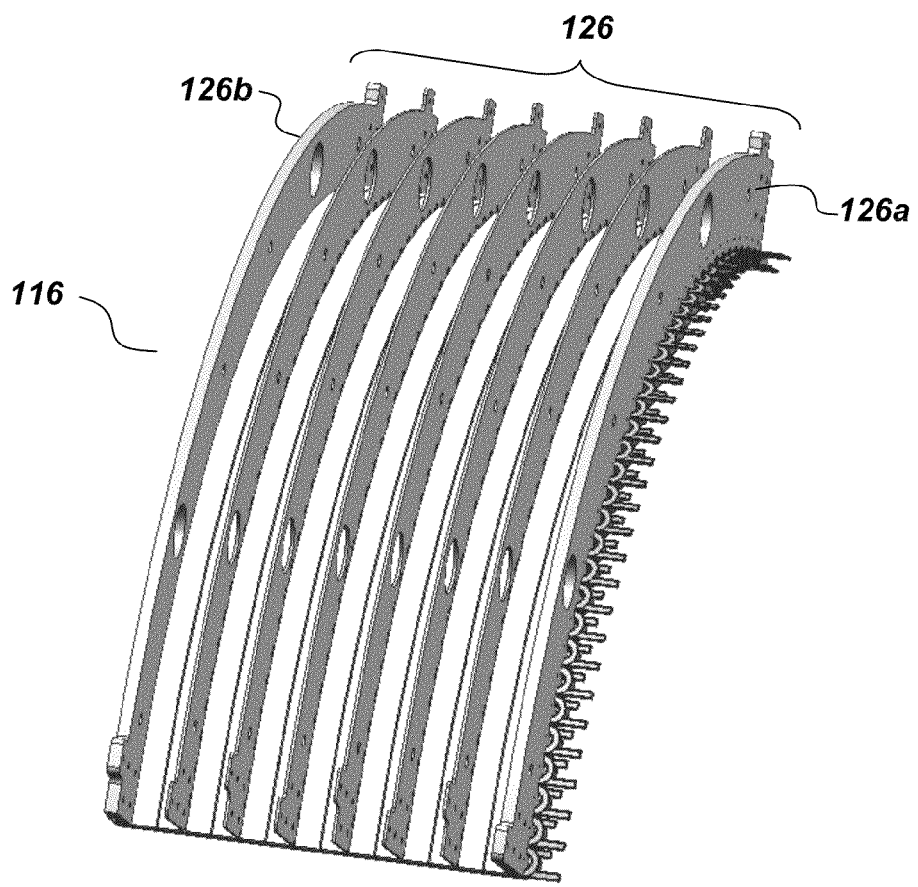
FIG. 3A illustrates a top view of a stator segment or portion of a stator assembly according to an exemplary embodiment of the present invention.

One of the stator segments 116 is shown in FIG. 3A. Each stator segment 116 includes structural plates (or support plates) 126. The structural plates 126 can include end plates 126a and 126b arranged exterior to intermediate or remaining structural plates 126 in an axial direction. The end plates 126a, 126b can be of the same or different thickness than the intermediate structural plates 126. For example, the end plates 126a, 126b can be significantly thicker than the other structural plates 126 to provide for structural integrity when the stator segments 116 are assembled to form the segmented stator assembly 114.

Figure 3B:
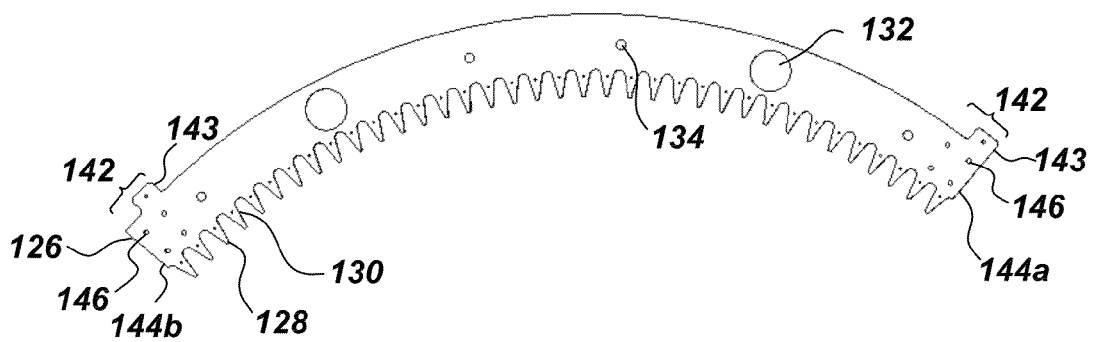
FIG. 3B illustrates a cross-sectional view of one of the support plates shown in FIG. 2A according to an exemplary embodiment of the present invention.
Figure 4:
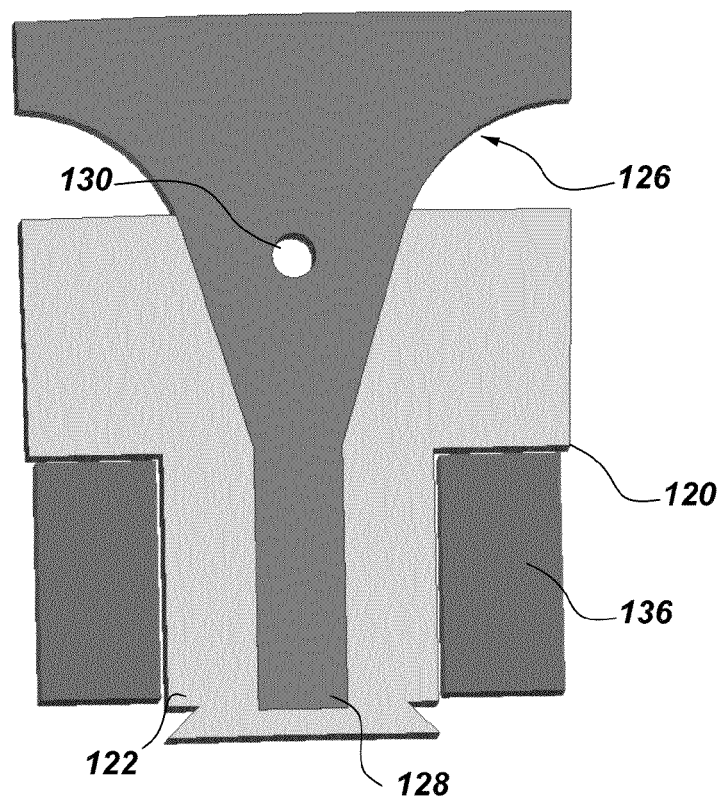
FIG. 4 illustrates a cross-sectional view of a structural plate in the stator segment shown in FIG. 3A.

As shown in FIG. 3B, each of the structural plates 126 includes notch-like or tooth-like structures 128 formed on a portion of the structural plate 126 along an inner circumference. The structural plates 126 are embedded into the stator laminations 118, as shown in FIG. 4, via the teeth 128. The structural plates 126 protrude radially outward beyond the stator core 118 to facilitate coupling of the structural plates to provide structural integrity to the stator segment 116. In the drawings, eight structural plates 126 are shown. However, it is to be understood that any number of structural plates 126 can be used depending on the design and application. The thickness and material of the structural plates 126 are of a size and material to minimize performance loss. The number and location of the structural plates depend upon the application and desired performance. In other embodiments, the end plates 126a, 126b need not be embedded into the stator laminations and can be configured without the tooth-like structures 128.

Figure 5:
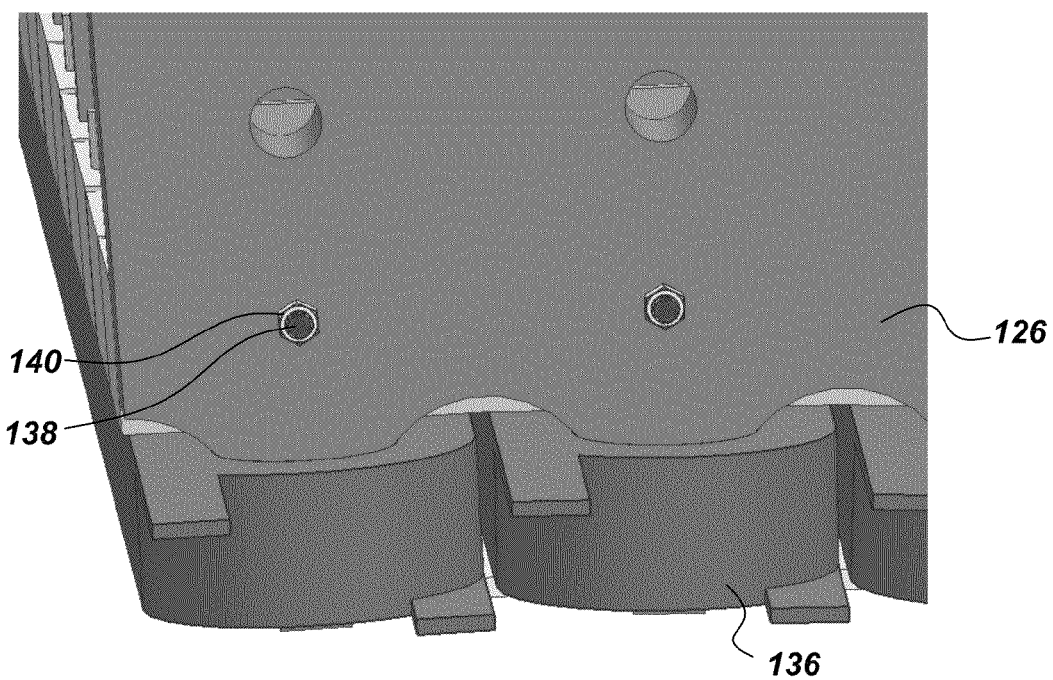
FIG. 5 illustrates a side view of the structural plates in the stator segment shown in FIG. 3A according to an exemplary embodiment of the present invention.

Referring to FIGS. 3B and 4, the structural plates 126 each include an opening 130 proximate each of the teeth 128 for receiving a securing member or a connector such as a tension rod or bolt, for example. Any suitable connector can be used and the opening can be arranged to accommodate the corresponding connector. The connector goes through the stator core 120 and the openings 130 in the structural plates 126. Referring to FIG. 5, tension rods or through-bolts 138 secured by nuts 140 are used to hold the structural plates 126 together firmly via the openings 130.

Figure 6:
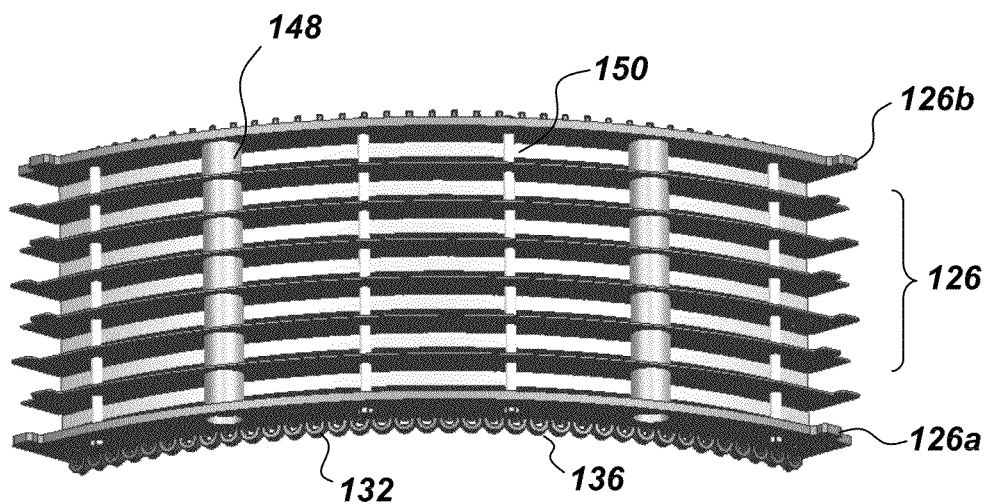
FIG. 6 illustrates a top view of a stator segment or portion of a stator assembly according to another exemplary embodiment of the present invention.

Referring to FIG. 3B, each of the structural plates 126 further includes openings 132 to receive additional connectors or stabilizing elements 148 such as pipes, I-beams, or some other suitable stabilizing elements to connect the structural plates 126 together. The additional connectors 148 provide support and rigidity to the stator segment 116 via the structural plates 126, which will provide structural integrity to the stator assembly 114 when the stator segments 116 are secured together. Each stator segment 116 may further include openings 134 to accommodate spacer elements 150 to provide another connection point for the structural plates 126. The spacer elements 150 can be any suitably rigid elements such as bolts, rivets or weldments, for example. In the exemplary embodiment shown in FIG. 6, both the stabilizing elements 148 and the spacer elements 150 are used. However, the stabilizing elements 148 can be used alone or in combination with any number of spacer elements 150.

While exemplary embodiments of the invention have been illustrated with multiple sets of openings 130, 132 and 134 to accommodate multiple sets of connectors, one skilled in the art will appreciate that embodiments of the invention are not limited to this arrangement and any single set of openings and connectors can be used to secure the structural plates 126 of the stator segment 116, or any combination of the sets of openings and respective connectors can be used. The location of the sets of openings can be arranged in any manner suitable to the application and configuration of the structural plates.

As shown in FIG. 3B, each structural plate 126 includes end portions 142 arranged at the outside circumferential end of each of the structural plates 126.

The end portions 142 are provided to couple the structural plates 126 in a stator segment 116 to the structural plates 126 of other stator segments 116 to form the stator assembly 114. In the exemplary embodiment shown, for each structural plate 126, the end portions 142 each include a tab portion 143 that extends radially beyond the remainder of the structural plate 126. The tab portions 143 can be arranged such that one tab portion 143 is set back from the circumferential end 144a of the structural plate 126, while the other tab portion 143 is set at the opposite circumferential end 144b. However, embodiments of the invention are not limited in this regard and the end portions 142 can be formed to accommodate a selected coupling structure. Each end portion 142 includes openings 146. These openings 146 are provided to facilitate securing the structural plate 126 of one stator segment 116 to the structural plate 126 of another stator segment 116.

Figure 7A:
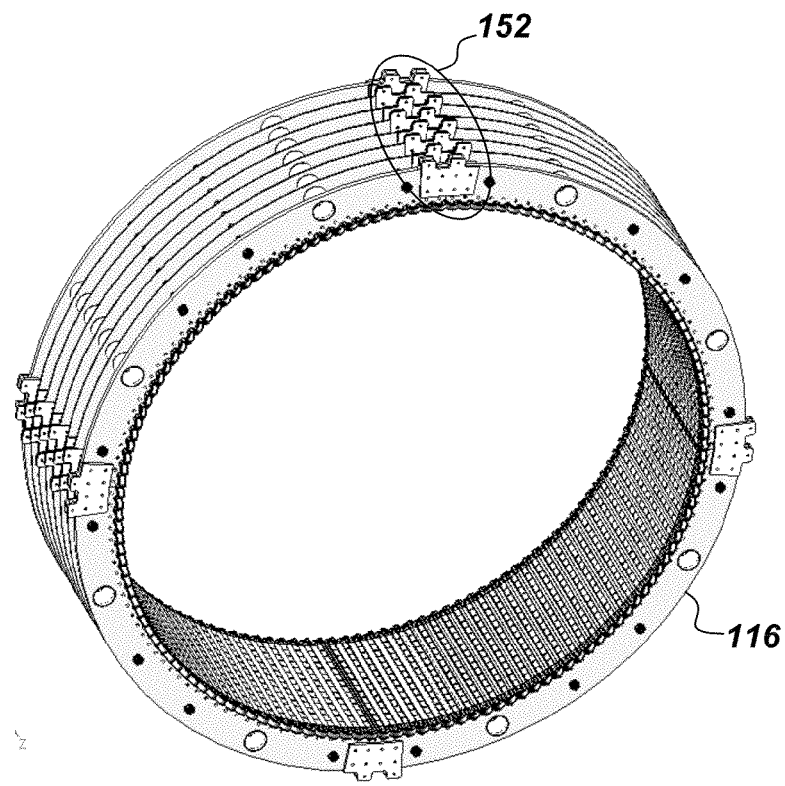
FIG. 7A illustrates a cross-sectional view of a segmented stator assembly having support plates according to an exemplary embodiment of the invention.
Figure 7B:
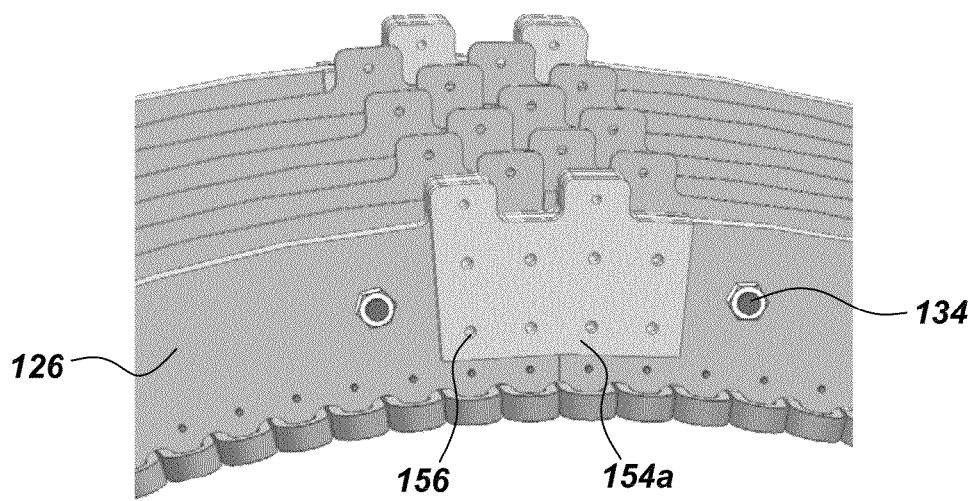
FIG. 7B illustrates a blown-up view of a portion of the segmented stator assembly shown in FIG. 7A.
Figure 8:
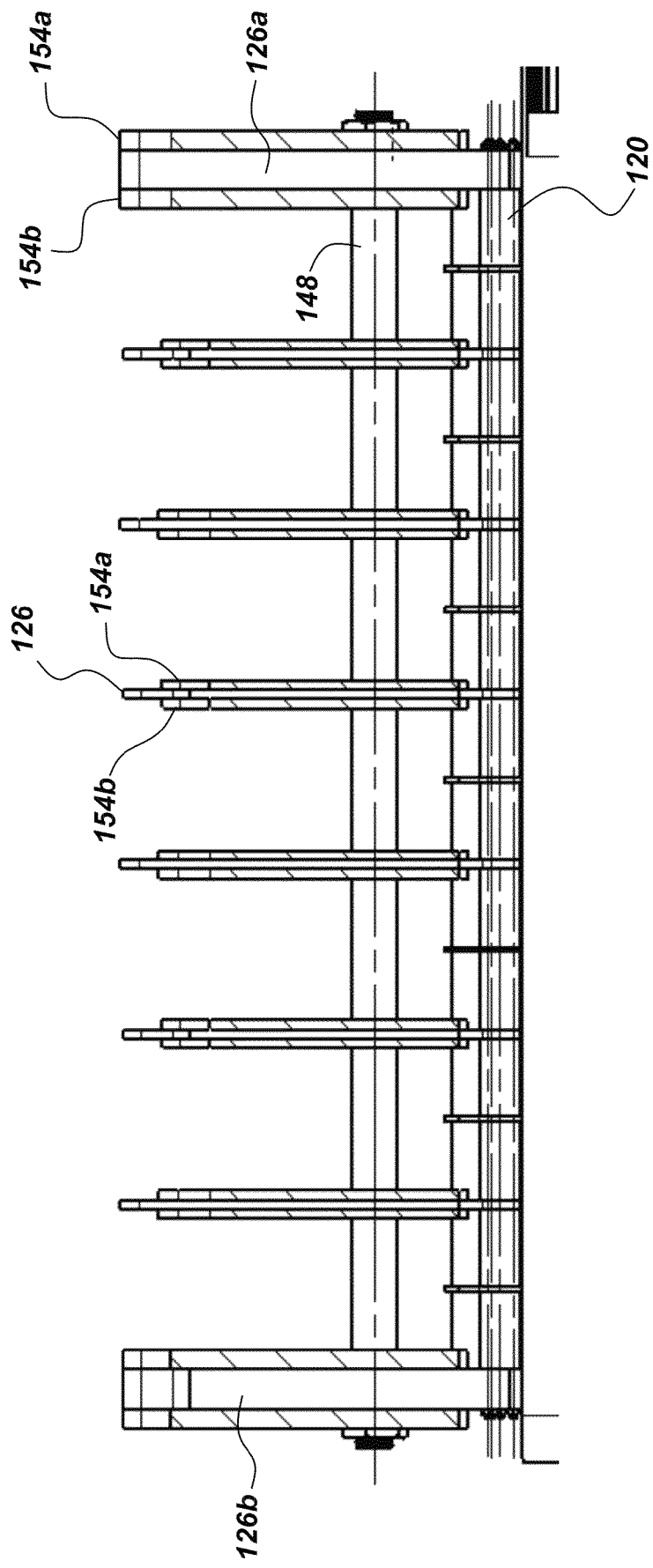
FIG. 8 illustrates a cross-sectional view of the stator segment having support plates and splice plates according to an exemplary embodiment of the present invention.

In the exemplary embodiment shown in FIGS. 7A, 7B and 8, the structural plates 126 are secured together via splice plates 154a and 154b. FIG. 7A shows the stator segments 116 assembled to form the stator assembly 114. FIG. 7B is a blown-up view of section 152 of FIG. 7A. FIG. 8 illustrates a cross-sectional view of a stator segment 116 including splice plates 154a and 154b. The splice plates 154a and 154b are configured to correspond to the form of the end portions 142, as shown in FIG. 3B. The splice plates 154a and 154b include openings 156 that correspond to the openings 146 in the end portions 142 of the structural plates 126. As shown in FIG. 8, the splice plates 154a and 154b are arranged axially on either side of the structural plates 126, including the end plates 126a, 126b that are to be coupled together. The splice plates 154a, 154b and the end portion 142 of adjacent structural plates 126 are coupled together by fastening elements such as bolts, for example. Other fastening means such as riveting, welding or brazing could also be used. Each of the structural plates 126 in the stator segment 116 is coupled to corresponding structural plates 126 of an adjacent stator segment 116 in this manner to provide a secure structure when the stator segments 116 are coupled together to form the stator assembly 114.

Figure 9:
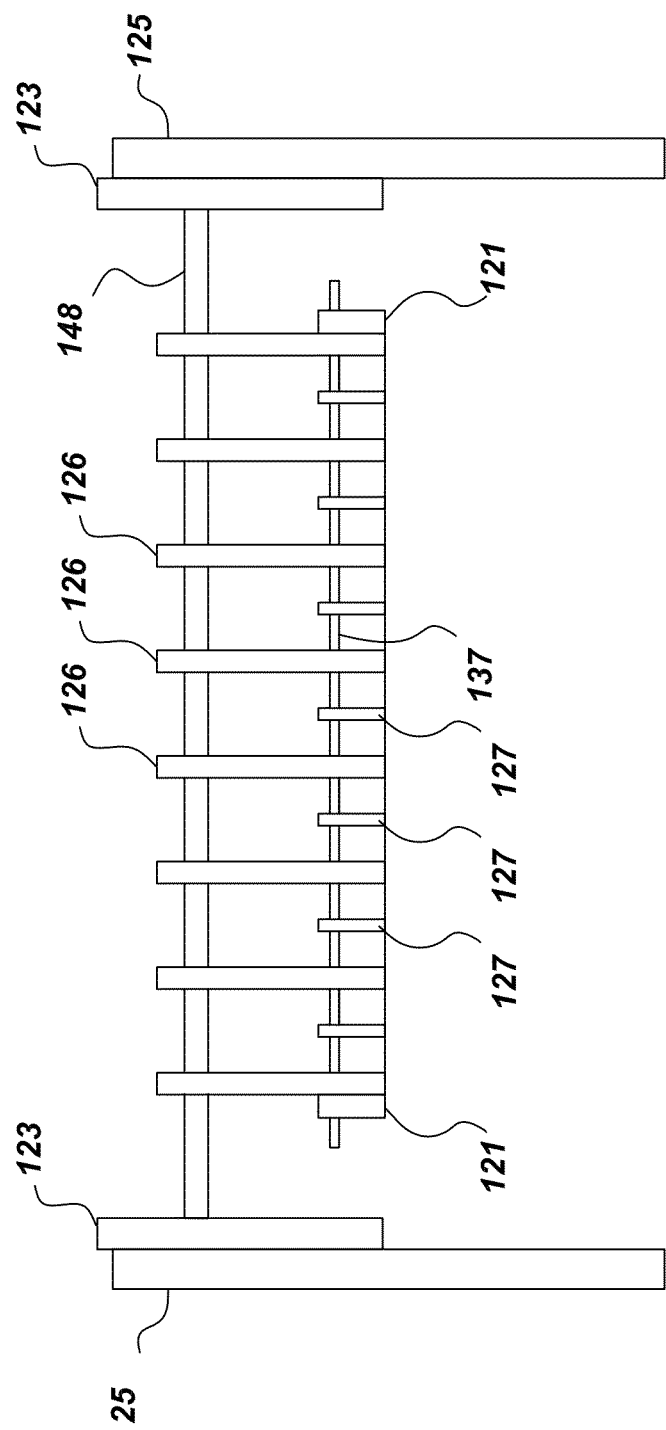
FIG. 9 illustrates a diagrammatic view of a stator segment of a stator assembly according to a further exemplary embodiment of the invention.

In the embodiment shown in FIG. 9, the end plates 123 are separate from the structural plates 126 and are not embedded within the stator laminations 118.

The end plates 123 are secured to supports 125 and stabilizing elements 148. This embodiment also includes spacer plates 127 that are embedded into the stator laminations and have a tooth-like shape similar to that of the structural plates 126. The spacer plates 127 provide radial cooling for the stator assembly. The embodiment is not limited to the use of spacer plates 127. They may be omitted or replaced by some other spacing element. Finger plates 121 are provided together with tension rod 137 to compress the laminations 118, spacer plates 127 and structural plates 126 together. Stator segments 116 according to this embodiment are joined together to form a stator assembly 114 using splice plates (not shown), similar to splice plates 154a, 154b.

While end portions and splice plates have been used in the exemplary embodiments of the invention, one skilled in the art will appreciate that the structural plates 126 of adjacent stator segments 116 can be coupled together by any suitable mechanism to maintain the strength and structural integrity of the segmented stator assembly 114.

Figure 10:
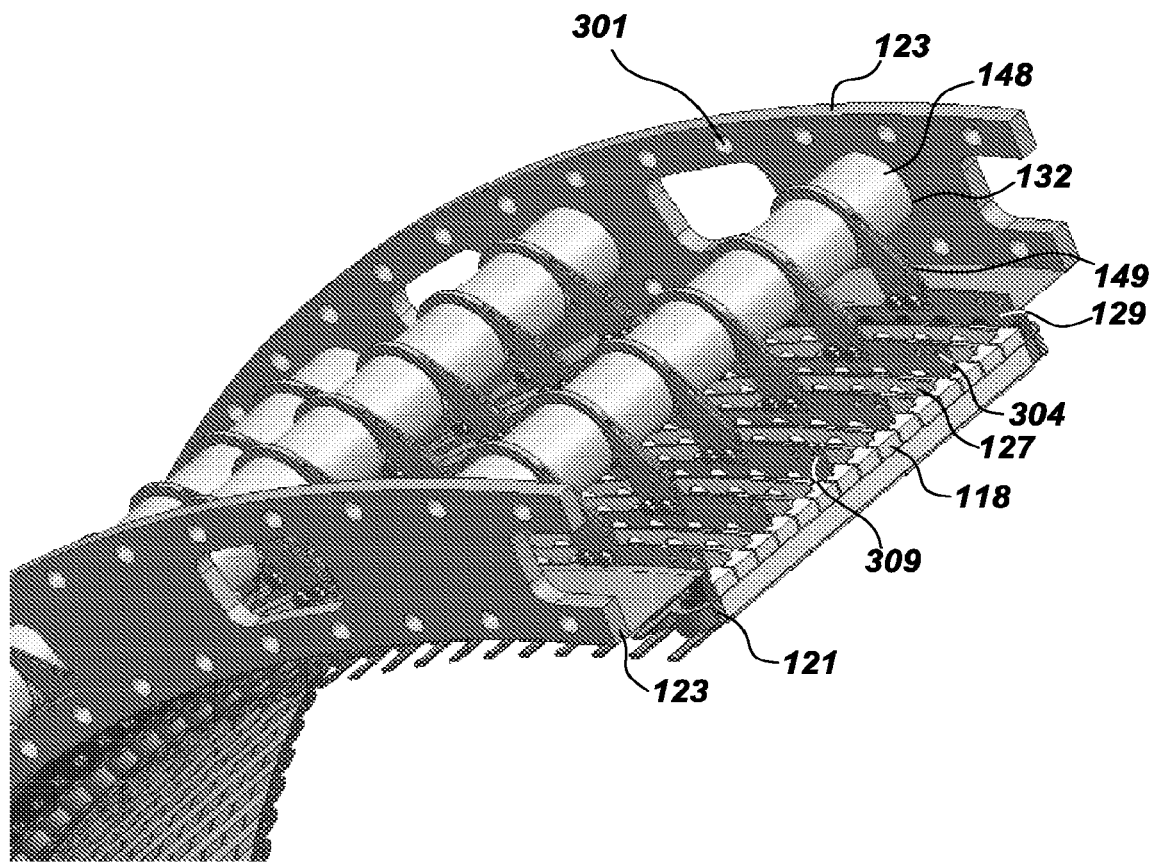
FIG. 10 illustrates a diagrammatic view of yet another exemplary embodiment of a stator segment of a stator assembly.
Figure 11:
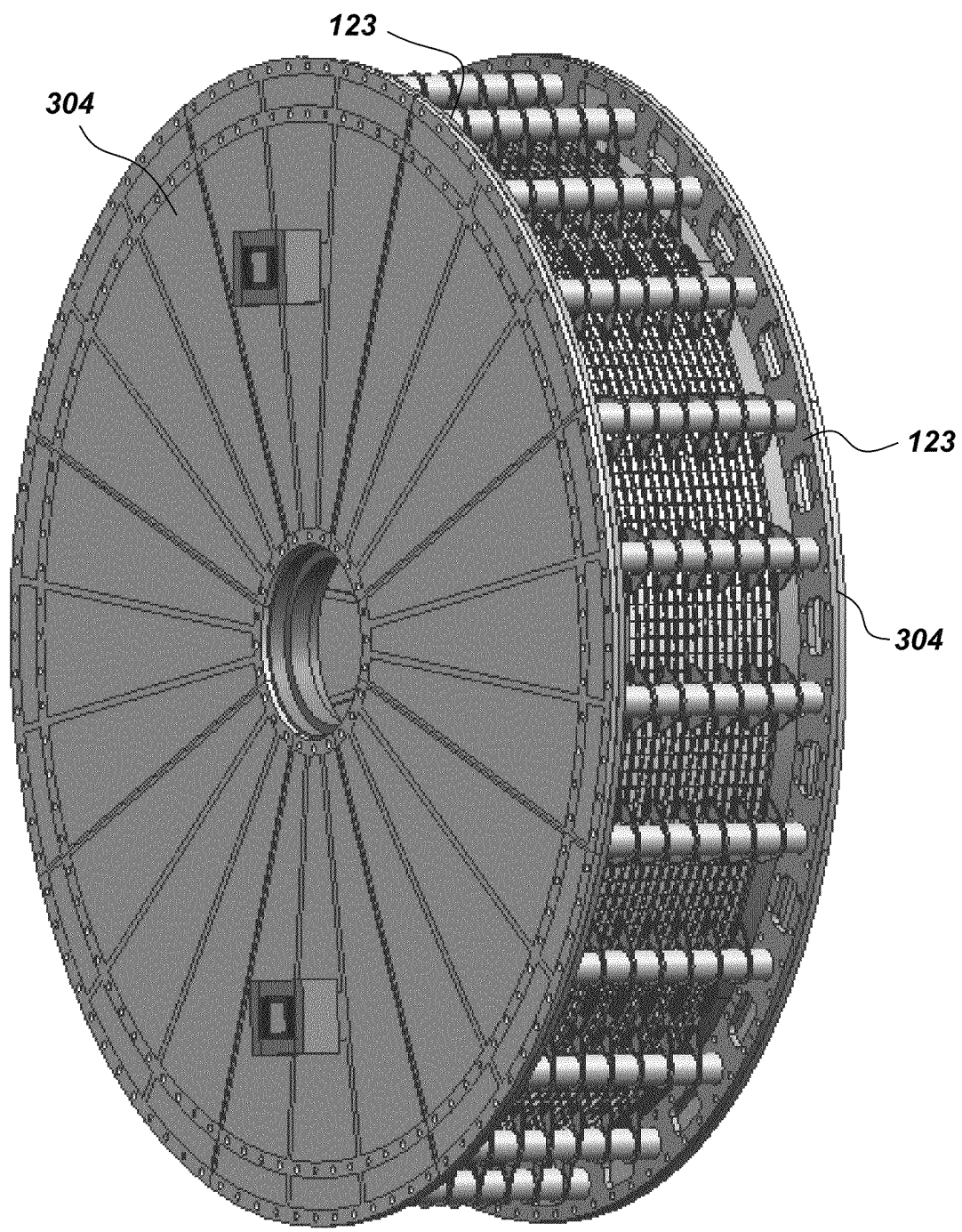
FIG. 11 illustrates another diagrammatic view of the exemplary embodiment shown in FIG. 10.

Another exemplary embodiment of a stator segment 116 is illustrated in FIG. 10. In this arrangement, the structural plates 129 protrude radially above the stator laminations 118. However, the height of the structural plates 129 is reduced in size and the structural plates 129 are coupled to the stabilizing elements 148 via hanging members 149. Hanging members 149 are coupled to each of structural plates 129 via bolts, welding, or some other suitable securing mechanism. The embodiment shown also includes spacer plates 127. However, the spacer plates 127 may be removed or replaced with other spacer elements. Finger plates 121 are shown to compress the laminations 118, spacer plates 127 and the structural plates 129 together via a tension rod or some other means. The structure is supported by end plates 123. In this embodiment, the structural plates 129 include openings 299 on either end to facilitate connection to adjacent structure plates 129 of an adjacent stator segment 116 via splice plates (not shown), for example. The end plates 123 include openings 301 to facilitate coupling to end covers 304, as shown in FIG. 11. The end plates 123 are bolted to the end covers 304. However, any other suitable connection means can be used to couple the stator segments 116 to the end covers 304. The end covers 304 can each be configured as a single, continuous element or as two or more elements that are connected.

Figure 12:
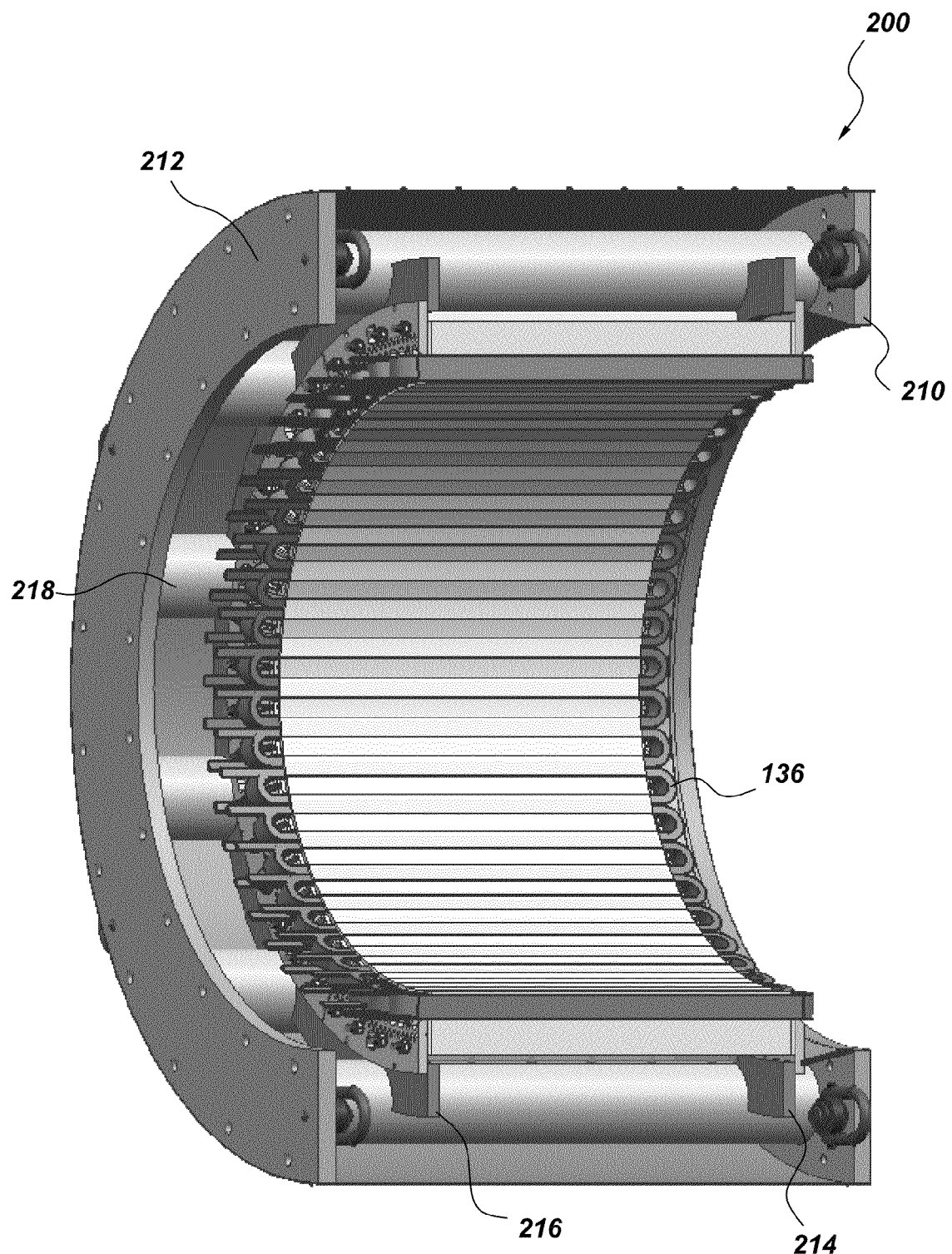
FIG. 12 illustrates a diagrammatic view of a stator segment of a stator assembly according to a further exemplary embodiment of the present invention.

Another exemplary embodiment of a stator segment is shown in FIG. 12. In this embodiment, the stator segment 200 includes end plates 210 and 212, compression plates 214 and 216, and stabilizing elements 218 such as pipes, for example, to couple all of the plates together to form a rigid structure for the stator segment 200. In this exemplary embodiment, there are no structures embedded in the stator laminations.

Figure 13:
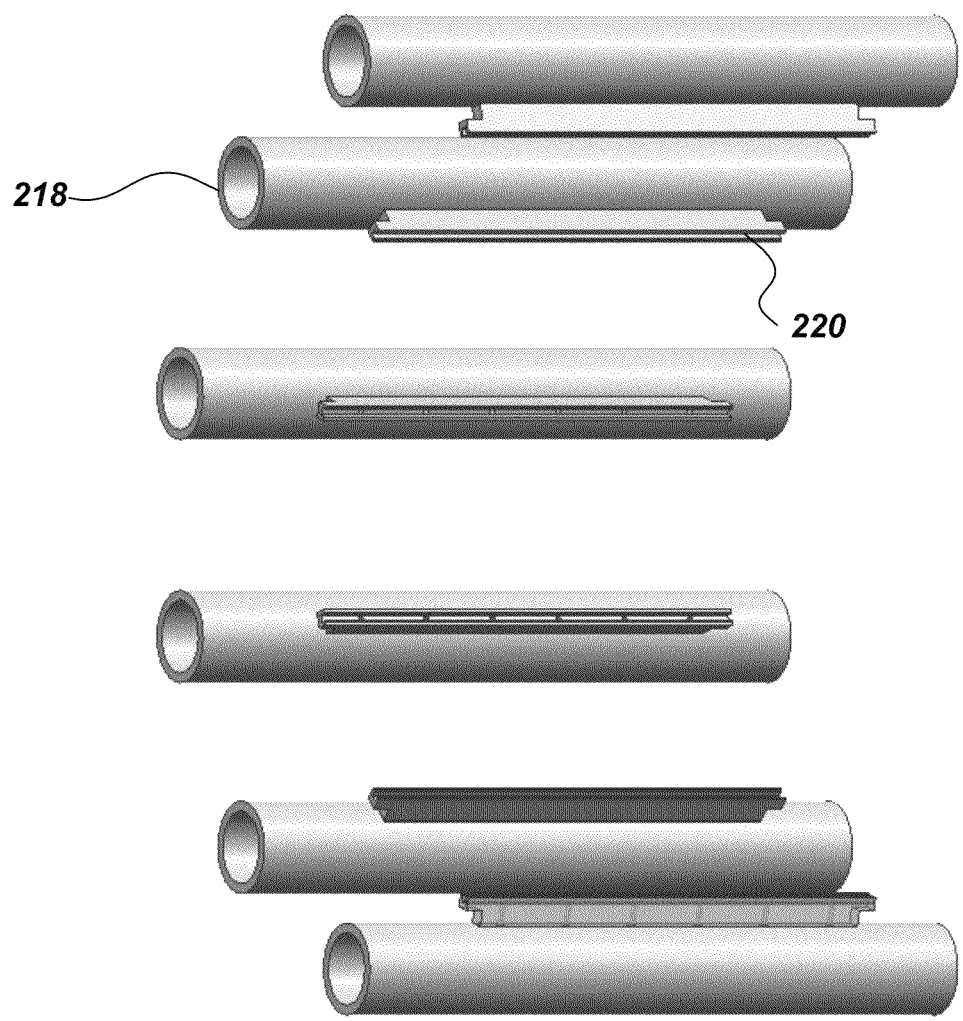
FIG. 13 illustrates stabilizing elements according to an exemplary embodiment of the invention.
Figure 14:
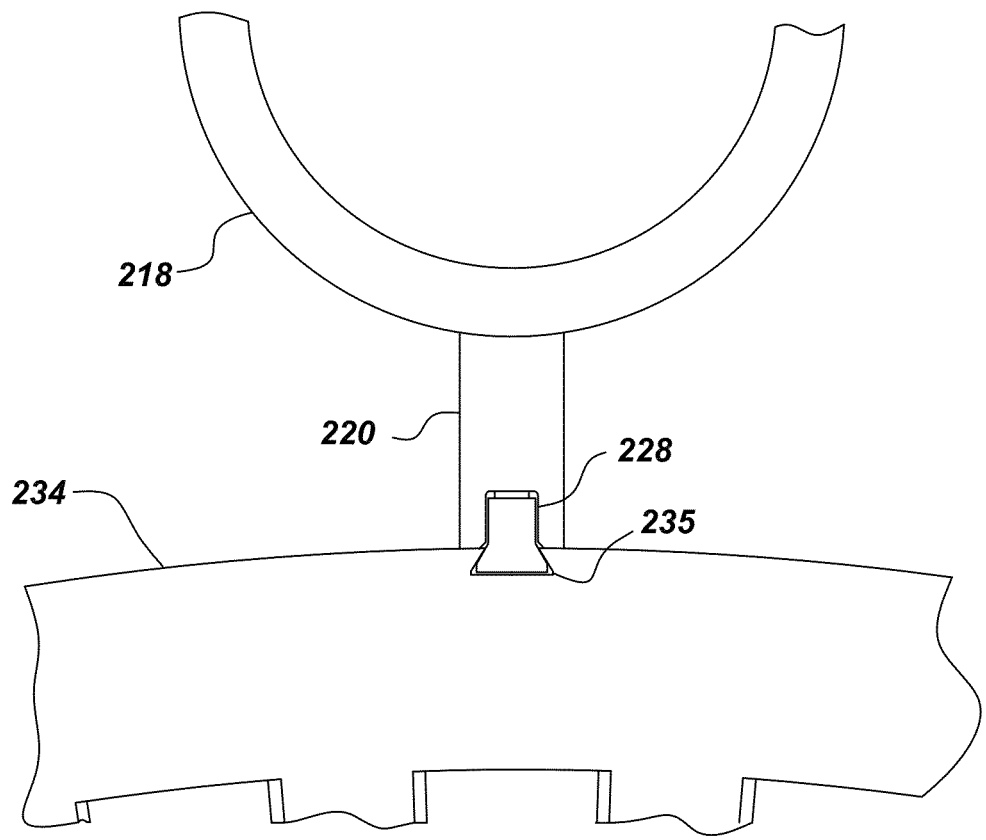
FIG. 14 illustrates a cross-sectional view of the stabilizing elements according to an exemplary embodiment of the invention.

Referring to FIGS. 13 and 14, each of the stabilizing elements 218 includes a dovetail bar 220. A dovetail 228 is secured to each of the dovetail bars 220. Each dovetail 228 engages with the stator laminations 234 (and with the supporting elements if utilized) and thus connects the laminations 234 to the stabilizing elements 218. As shown in FIG. 14, in this exemplary embodiment, each of the stator laminations 234 includes openings or notches 235 to accommodate the dovetails 228. The number of stabilizing elements 218 including dovetail bars 220 and dovetails 228 can be selected depending upon the particular configuration and desired stiffness of the stator segment. The number and location of notches 235 can be arranged to correspond to the number and location of the dovetails 228. The end plates 210, 212 and the compression plates 214, 216 are secured to the stabilizing elements 218, as shown in FIG. 14. They may be integral to the stabilizing elements 218 or secured to the stabilizing elements 218 by welding, for example, or other suitable means.

Figure 15:
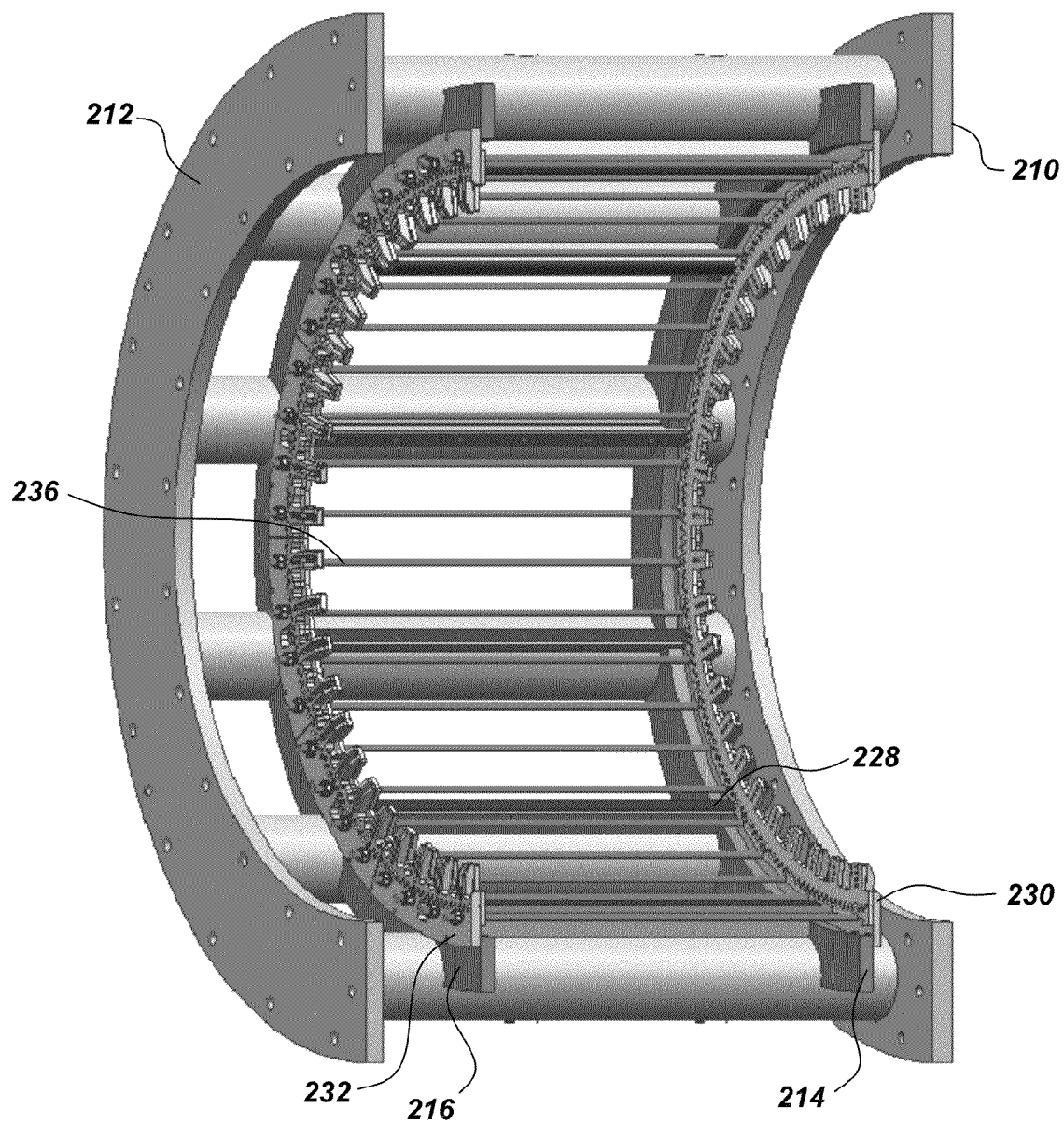
FIG. 15 illustrates a support structure for a stator segment according to an exemplary embodiment of the present invention.
Figure 16:
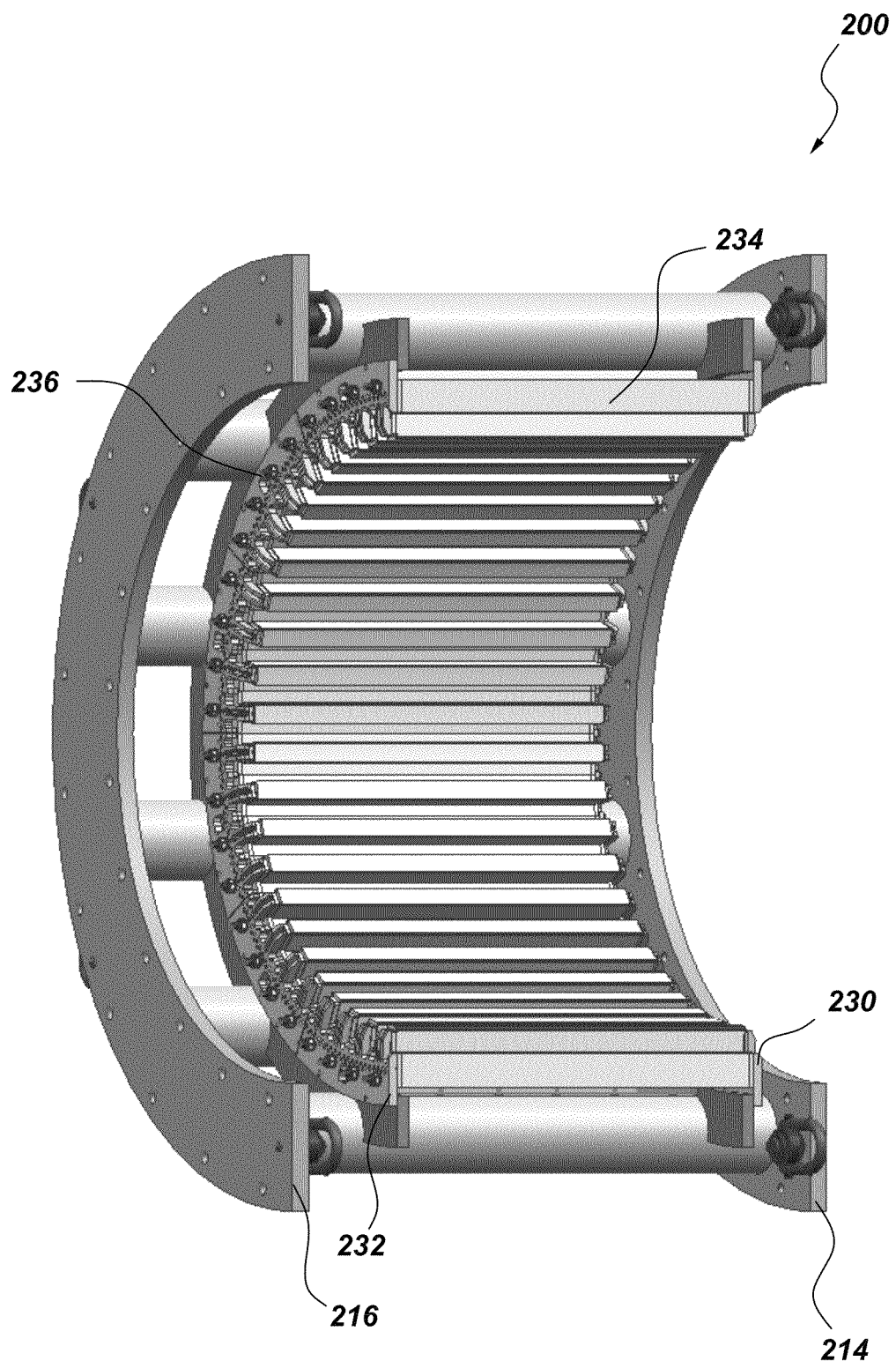
FIG. 16 illustrates the support structure for a stator segment a stator segment according to an exemplary embodiment of the invention.

Referring to FIGS. 15 and 16, clamping plates 230 and 232 are secured to the compression plates 214 and 216, respectively. Any suitable means can be used to secure the clamping plates 230, 232 to the compression plates 214, 216. The stator laminations 234 are arranged between the clamping plates 230 and 232. The clamping plates 230, 232 and stator laminations 234 are secured together via tension rods 236, or other suitable securing mechanism. In this exemplary arrangement, there are no supporting or structural elements or plates embedded into the stator laminations 234, however such elements may also be used. The strength of the stator segment 200 is established by the end plates 210, 212, the compression plates 214, 216 and the stabilizing elements 218, which support the stator laminations 234. In this exemplary embodiment, the end plates 210, 212 are of a thickness and material to provide strong support and structural integrity to the stator segments 200 as well as the stator assembly 114.

Figure 17:
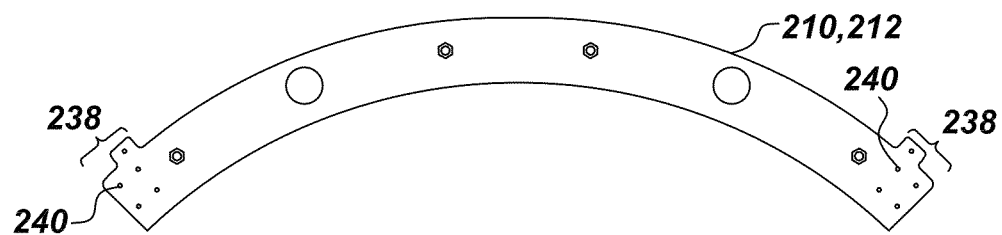
FIG. 17 illustrates a cross-sectional view of an end plate according to an exemplary embodiment of the invention.
Figure 18:
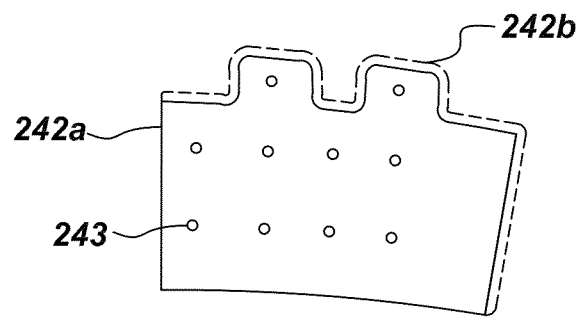
FIG. 18 illustrates connecting elements according to an exemplary embodiment of the present invention.

Referring to FIGS. 17 and 18, the end plates 210 and 212 have end portions 238 having openings 240 similar to the end portions 142 and openings 146 shown 23 in FIG. 3B. As shown in FIG. 15, the end plates 210 and 212 of adjacent stator segments 200 are secured together via splice plates 242a and 242b in the same manner as the splice plates 154a, 154b. The splice plates 242a and 242b are configured to correspond to the form of the end portions 238. The splice plates 242a and 242b include openings 243 that correspond to the openings 240 in the end portions 238 of the end plates 210 and 212. The splice plates 242a and 242b are arranged axially on either side of the end plates 242a, 242b that are to be coupled together. The splice plates 242a, 242b and the end portion 238 of adjacent end plates 210, 212 are coupled together by fastening elements such as bolts, for example. Each of the end plates 210, 212 in the stator segment 200 is coupled to corresponding end plates 210, 212 of an adjacent stator segment 200 in this manner to provide a secure structure when the stator segments 200 are coupled together to form the stator assembly 114. In this exemplary embodiment, the splice plates 242a, 242b can be of a larger size such that if there are only two stator segments 200, the splice plates 242a, 242b can be semi-circle in size to provide the fullest support. The size of the splice plates can be designed to any suitable size.

While end portions and splice plates have been used in the exemplary embodiments, one skilled in the art will appreciate that the end plates 210, 212 of adjacent stator segments 200 can be coupled together by any suitable mechanism to maintain the strength and structural integrity of the segmented stator assembly 114.

Figure 19A:
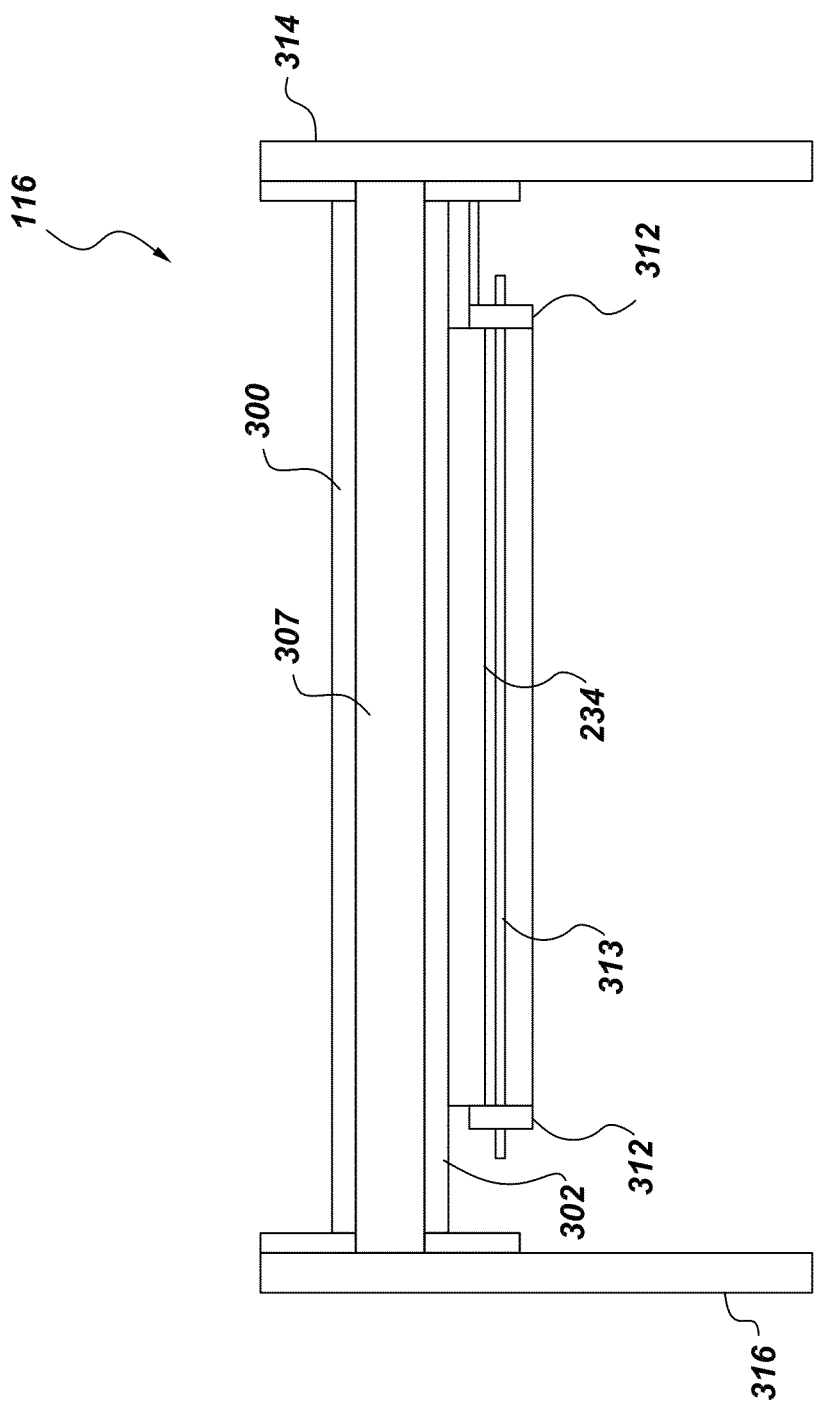
FIGS. 19A and 19B illustrate a cross-sectional view and a diagrammatic view of a stator segment of a stator assembly according to another exemplary embodiment.
Figure 19B:
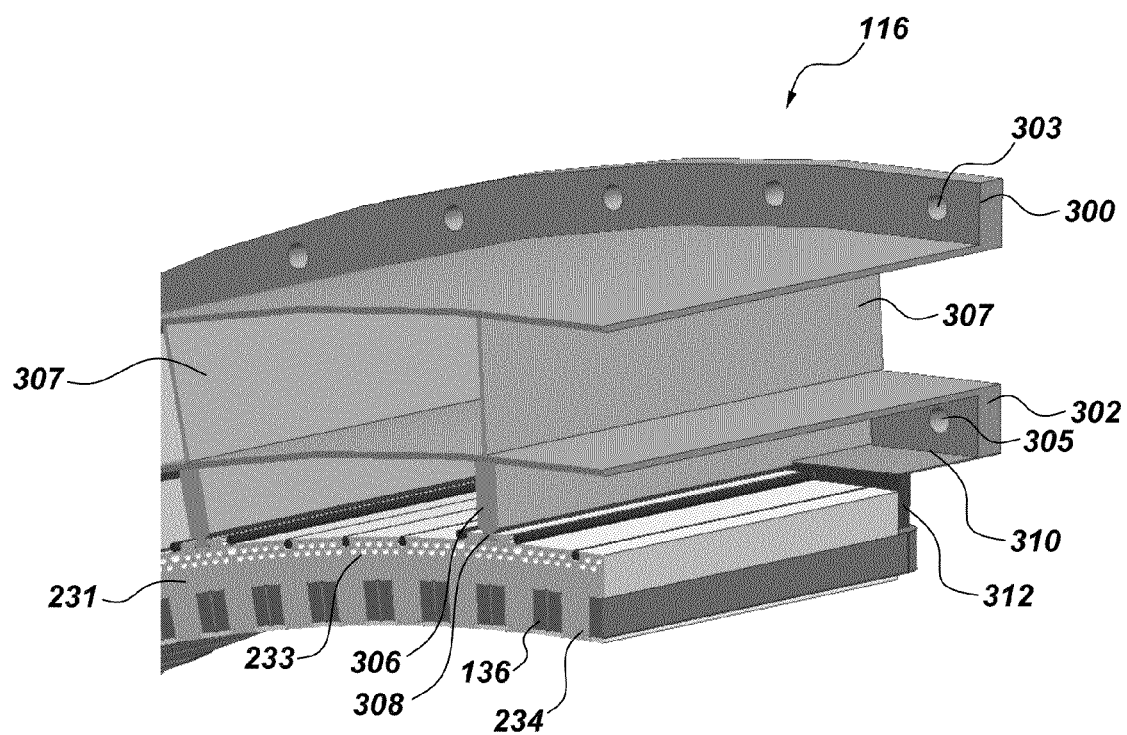

Another exemplary embodiment of a stator segment is shown in FIGS. 19A and 19B. In this embodiment, each stator segment 116 includes an outer shell 300 and an inner shell 302. The outer shell 300 includes openings 303, while the inner shell includes openings 305. These openings 303, 305 are provided to couple the stator segment 116 to outer covers or supports 314, 316. Webs 307 are arranged between the outer shell 300 and the inner shell 302 to provide support for the stator segment 116. Dovetail bars 306, each having a dovetail 308, are coupled to the inner shell 302. The outer shell 300, inner shell 302, webs 307, and the dovetail bars 306 are coupled together by welding. Any suitable method can be used for coupling these elements together. As in the embodiment shown in FIG. 14, each of the stator laminations 234 includes openings or notches 235 to accommodate the dovetails 308. In this embodiment, finger plates 312 are provided to compress the stator laminations 234 together via a tension rod 313 or some other tensioning element. Referring to FIG. 19B, the stator laminations 234 include openings 233 in the stator core or backbone 231 to provide for axial cooling of the stator segment 116. However, the embodiment is not limited to this arrangement, and the stator laminations 234 can be solid or include some other configuration.

Figure 20:
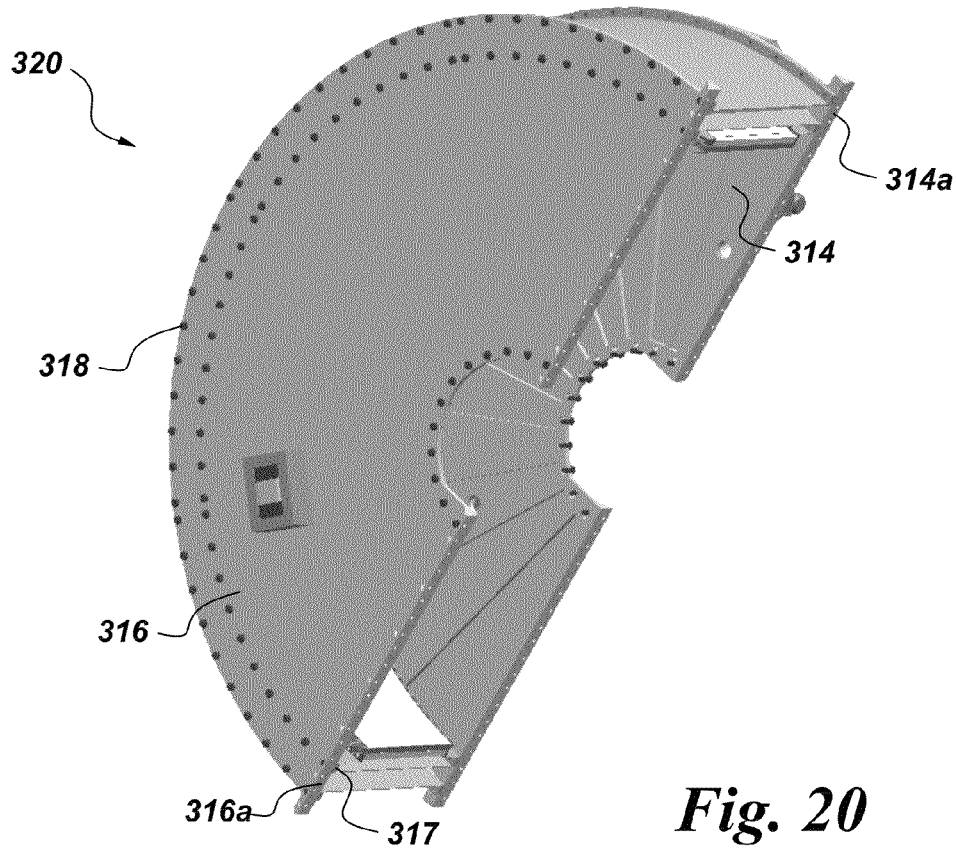
FIG. 20 illustrates an exemplary embodiment of a support structure for the embodiment shown in FIGS. 19A and 19B.
Figure 21:
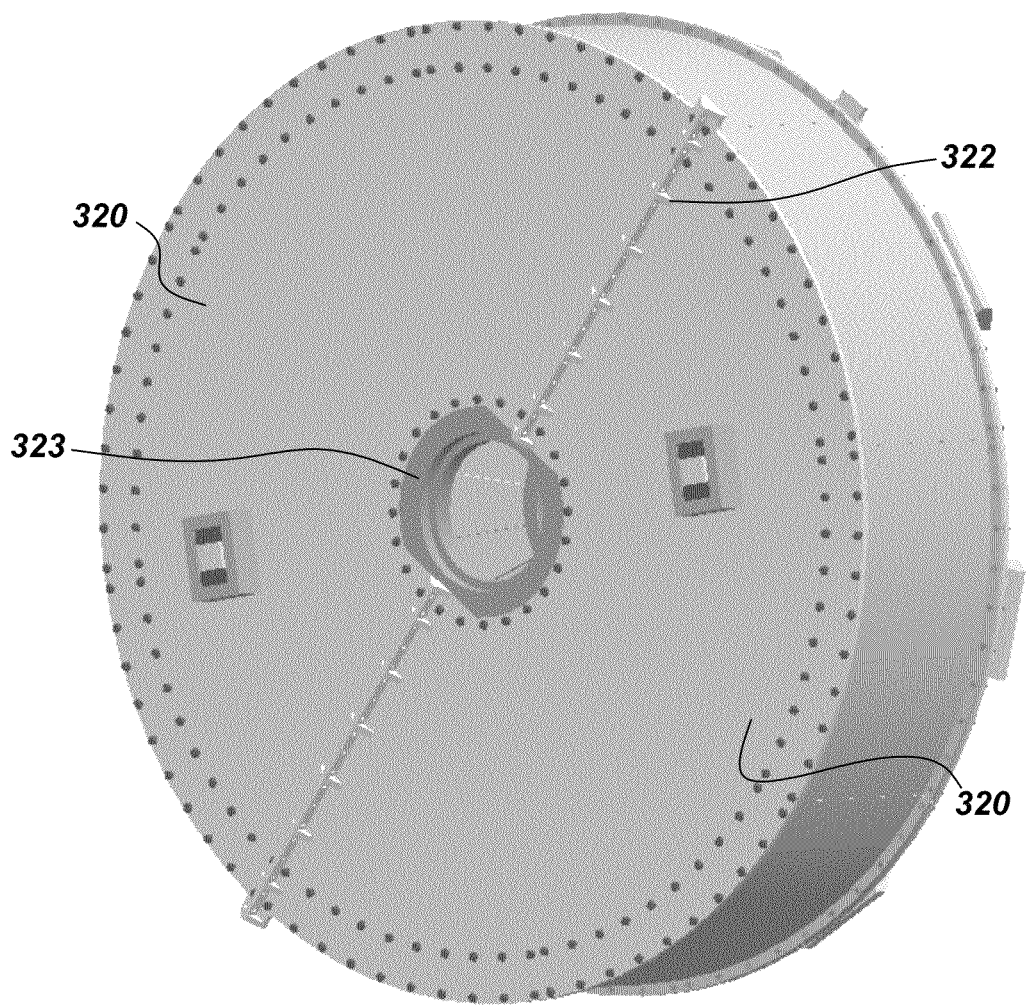
FIG. 21 illustrates an exemplary embodiment of an assembled stator assembly of the stator segment and the support structure shown in FIGS. 19A, 19B, and 20.

The stator segments 116 shown in FIGS. 19A and 19B are secured to outer covers or support structures 314 and 316, as shown in FIG. 20. The support structures 314, 316 each include openings 318 to facilitate coupling to the stator segments 116. The openings 303 and 305 of the outer and inner shells 300, 302 are aligned with the openings 318 of the support structures 314, 316 to allow coupling by bolts or other suitable fastening members. The cover 314 includes a flange 314a along the straight edge, and similarly, the cover 316 includes a flange 316a along the straight edge. Each of the flanges 314a, 316a includes openings 317 to receive bolts or other fastening elements. In this embodiment, the outer covers 314 and 316 are configured to house one half 320 of the stator assembly 114. More particularly, in the embodiment shown, four stator segments 116 are coupled to the covers 314 and 316 to form half of the stator assembly 114. The number of stator segments 116 arranged in the covers 314 and 316 will vary depending upon design and application to include one or more stator segments 116. Similarly, the configuration of the halves 320 may vary from being a single, continuous element to multiple elements combined together. FIG. 21 illustrates a fully assembled stator assembly 114 including the stator segments 116 shown in FIGS. 19A, 19B, and 20. The stator halves 320 are joined together by bolting the flanges 314a and 316a together via openings 317. The stator halves 320 are arranged in place around a hub 323. It should be understood that while two halves are disclosed, the support structures can be arranged in any configuration from a single, continuous structure to multiple structures.

Figure 22A:
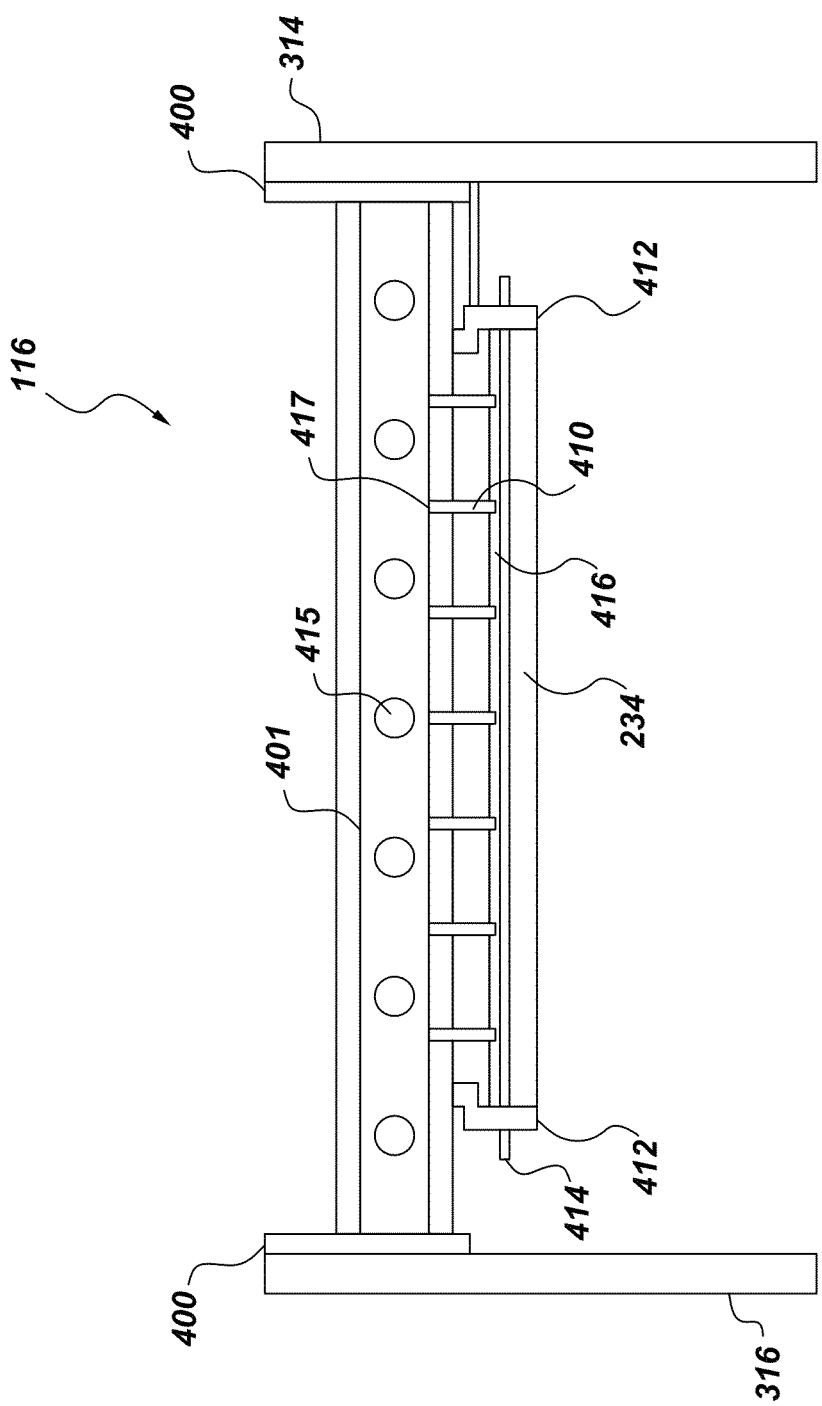
FIGS. 22A-22C illustrate a cross-sectional view and a diagrammatic view of yet another exemplary embodiment of a stator segment of a stator assembly.
Figure 22B:
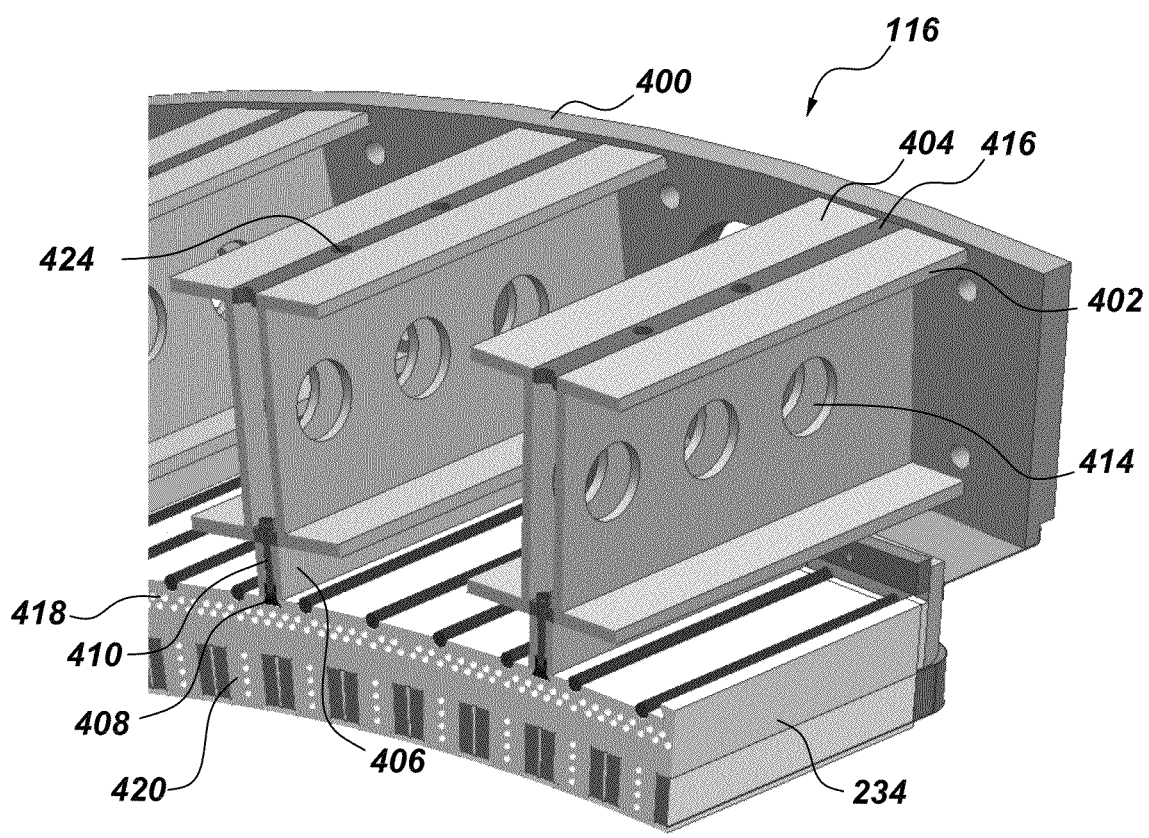
Figure 22C:
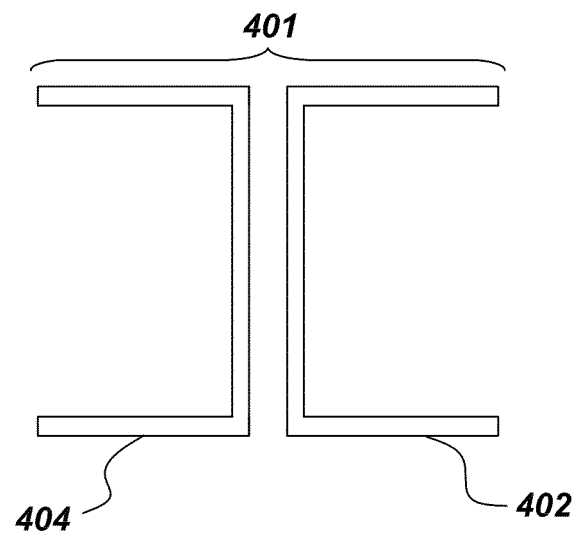

A stator segment 116 according to another exemplary embodiment is shown in FIGS. 22A-22C. This embodiment includes end plates 400 and split I-beams 401 each having sides 402 and 404 that are welded to the end plates 400. The sides 402, 404 of each split I-beam 401 could be coupled to the end plates 400 by any suitable fastening or securing mechanism. Dovetail bars 406 are provided to couple the split I-beams 401 to corresponding dovetails 408. The dovetail bars 406 each include openings 409 to accommodate dovetail bolts 410 the couple the dovetail bars 406 to the dovetails 408. The stator laminations 234 include openings 235 to accommodate the dovetails 408. Finger plates 412 are provided to compress the stator laminations 234 together via a tension rod 414, for example. As in the embodiment shown in FIGS. 19A and 19B, the stator segment 116 is secured to support structures 314 and 316 as shown in FIG. 20 to form stator halve 320. One or more stator segments 116 are arranged within the stator halve 320. Stator halves 320 are arranged on a hub 323 and coupled together to form the stator assembly as shown in FIG. 21. It should be understood that while two halves are disclosed, the support structures can be arranged in any configuration from a single, continuous structure to multiple structures. In the embodiment shown, openings 415 are provided to reduce the weight of the stator segment 116. However, embodiments of the invention can have different configurations.

FIG. 22B illustrates a cut-away view of the embodiment shown in FIG. 22A. The end portions of the sides 402, 404 in each of the I-beams 401 are coupled together by a lower element 416 and an upper element 417. The sides 402, 404 and the elements 416, 417 are welded together or coupled together by any suitable means. The lower and upper elements 416, 417 each include openings 424 that align with the openings 409 in each of the dovetail bars 406. The openings 424 enable access to the dovetail bolts 410, respectively. During assembly, the dovetail bolts 410 hold the dovetails 408 in place while the stator laminations 234 are arranged onto the dovetails 408. Once all of the stator laminations 234 are in place, the dovetail bolts 410 are tightened via openings 424 to secure the stator laminations 234 in place in the stator segment. In the embodiment shown, the stator laminations 234 each include openings 418 and 420 to facilitate axial cooling. However, other stator lamination configurations can be implemented.

Figure 23A:
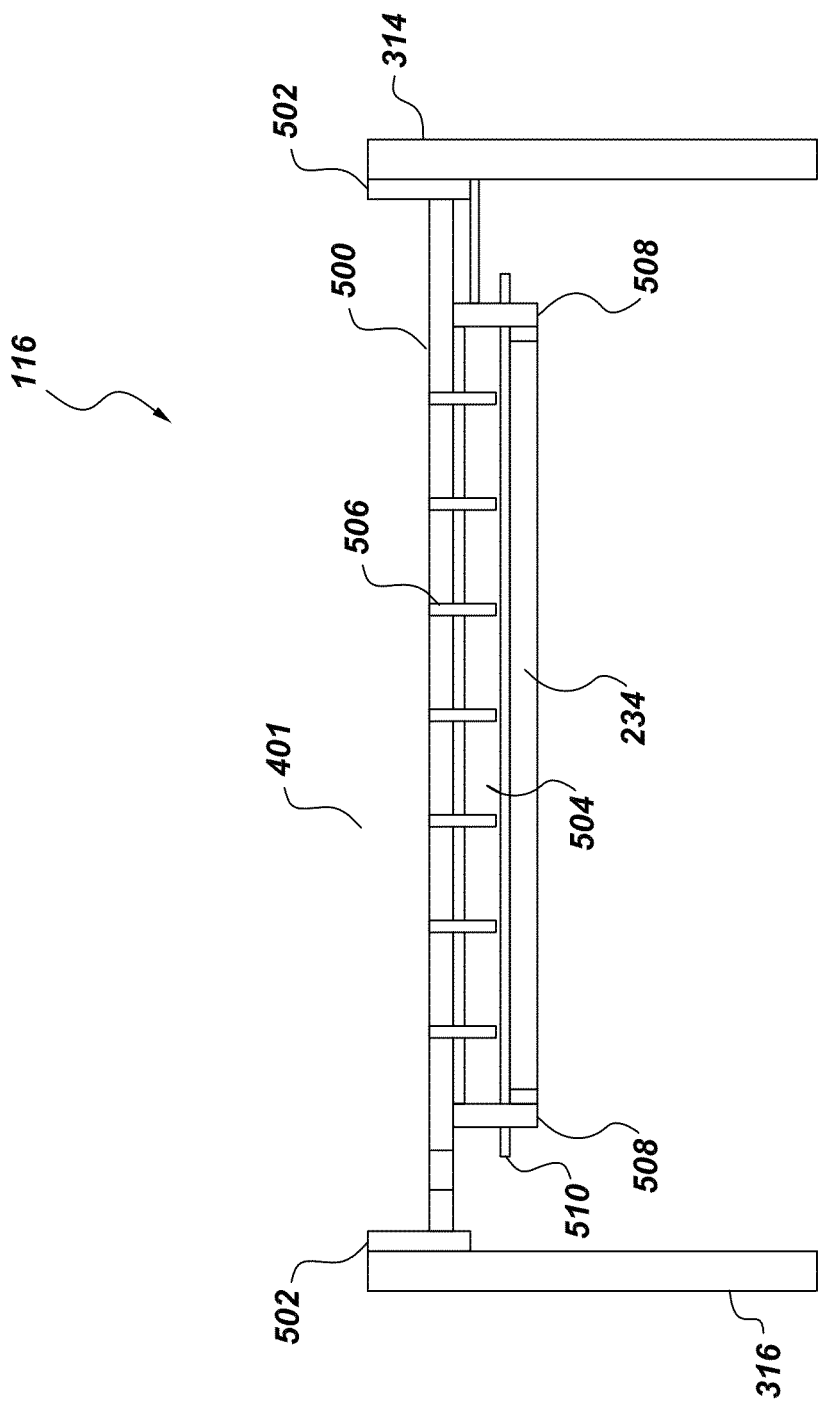
FIGS. 23A and 23B illustrate a cross-sectional view and a diagrammatic view of a stator segment of a stator assembly according to a further exemplary embodiment.
Figure 23B:
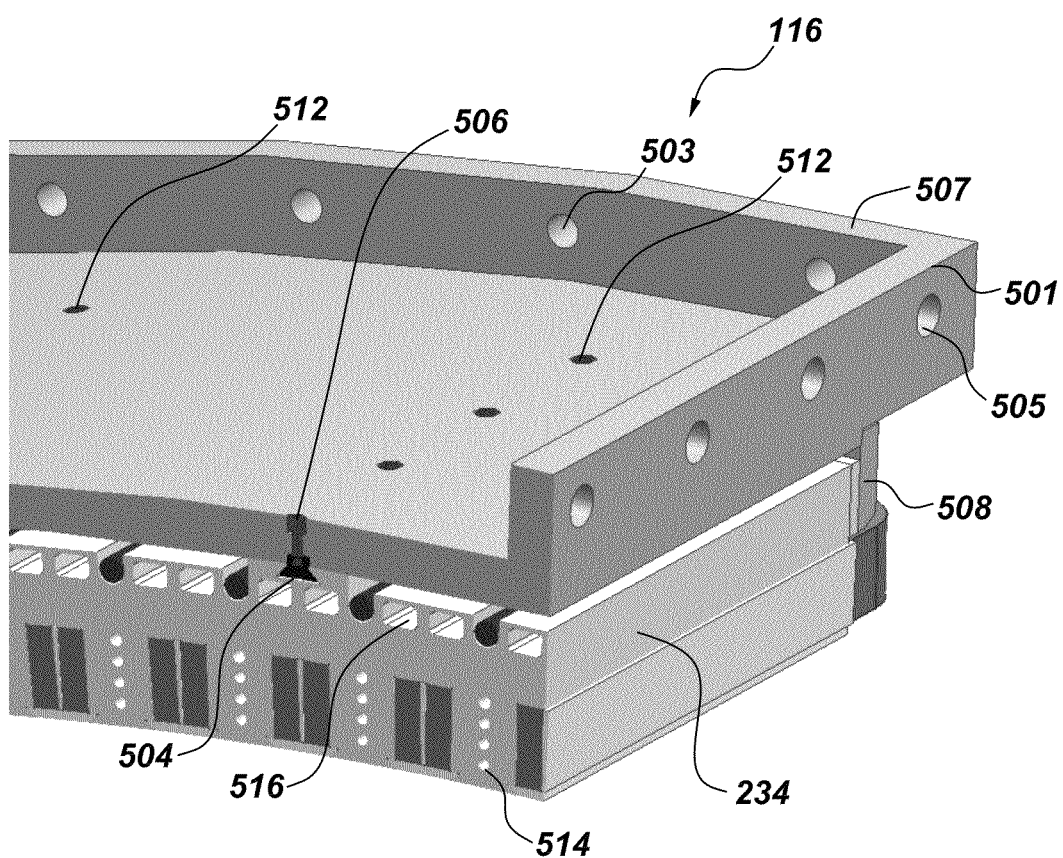

Another exemplary embodiment of a stator segment is shown in FIGS. 23A and 23B. The stator segment 116 includes a barrel shaped element 500 having openings 503, 505 and 512. Openings 503 provide for coupling the barrel 500 to support structures or covers 314 and 316 via bolts or some other means. Openings 505 are provided to couple adjacent stator segments 116 together via bolts or other securing element. Openings 512 are provided to enable dovetail bolts 506 to secure dovetails 504 to the barrel 500. In this embodiment, finger plates 508 are provided to compress stator laminations 234 together via a tension rod 510, for example. The stator laminations 234 include openings 235 to accommodate the dovetails 504. During assembly, the dovetail bolts 506 hold the dovetails 504 in place while the stator laminations 234 are arranged onto the dovetails 504. Once all of the stator laminations 234 are in place, the dovetail bolts 506 are tightened via openings 512 to secure the stator laminations 234 in place in the stator segment. In the embodiment shown, the stator laminations 234 each includes openings 514 facilitate axial cooling. However, other stator lamination configurations can be implemented. In some embodiments, openings 516 can also be provided to facilitate liquid cooling.

Figure 24:
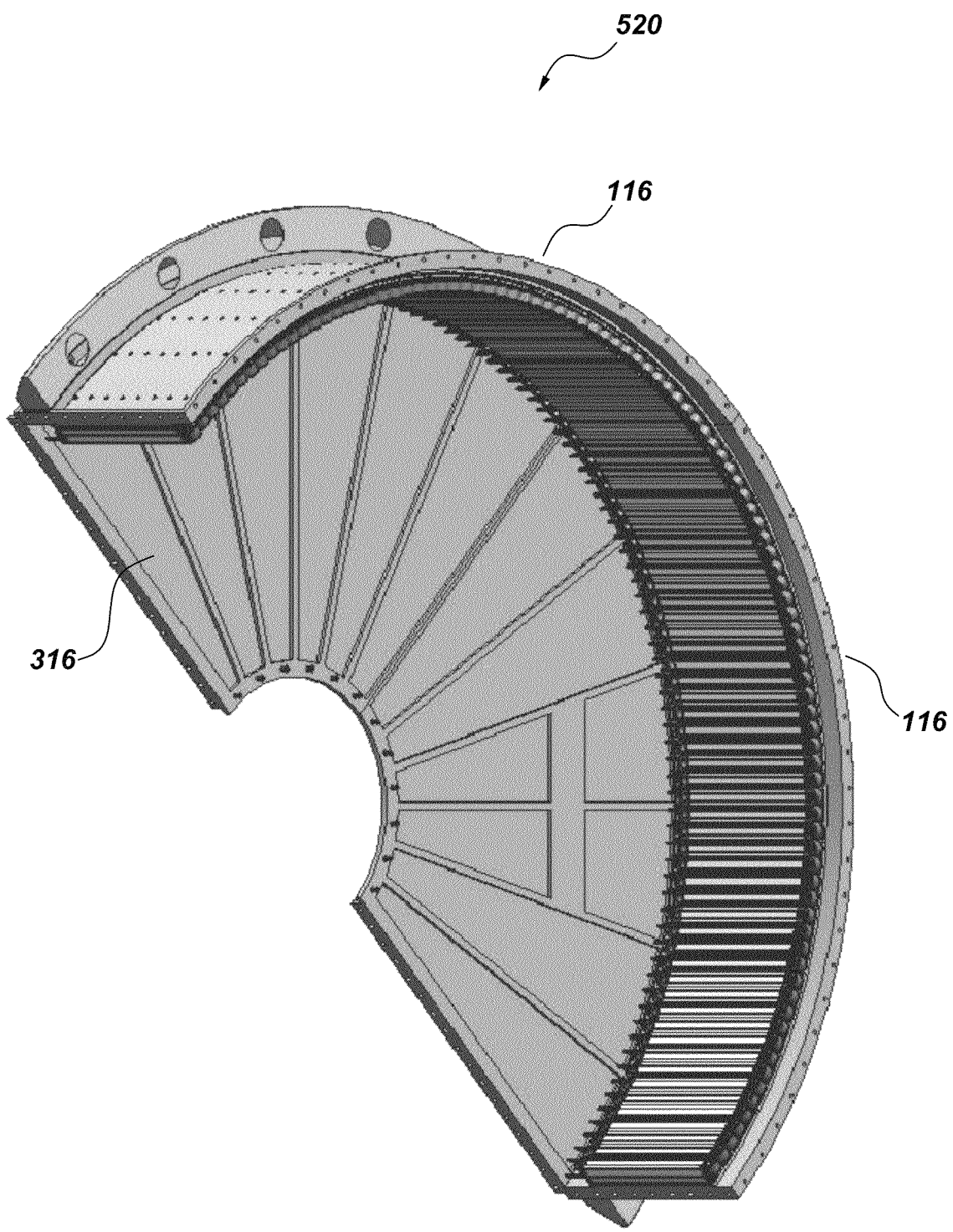
FIG. 24 illustrates an exemplary stator segment and support the stator segment shown in FIGS. 23A and 23B.

FIG. 24 illustrates a cut-away view of a portion of a stator assembly or stator assembly half 520 including the barrel stator segments 116 illustrated in FIGS. 23A and 23B. In this embodiment, two stator segments 116 are secured to the support structure 316. However, any number of stator segments can be coupled to the stator assembly portion 520. In addition, the support structures 314 (not shown in FIG. 24) and 316 can have any number of portions to support one or more stator segments based on the design and application. The barrel 500 is bolted to the support structures 314 (not shown in FIG. 24) and 316. In addition, the stator segments 116 are bolted together via openings 505. The stator portion 520 is coupled to another stator portion 520 to form a complete stator assembly 114.

The exemplary embodiments shown, concentrated winding are used. In some embodiments, the stator coils are arranged concentrically, and wound around each of the stator teeth. In other embodiments, the stator coils are arranged concentrically, and wound around alternate ones of the stator teeth. The concentrated winding 136 is wound around the stator tooth and the number of stator slots per rotor pole per phase are <1, i.e. it is a fractional slot winding. As opposed to a conventional stator, wherein the number of slots per rotor pole per phase is equal to or greater than unity. The interaction of rotor poles and the slotted stator for the fractional slot winding results in various MMF harmonics, which are exploited to yield a harmonic coupled machine. The concentrated winding with harmonic coupling offers a higher fill factor for the coils, better aspect ratio of stator teeth, and shorter end windings, which combine to enable higher torque density with relatively high pole count. For example, a 2/7 slot-per-pole-per phase winding design can be used to build a harmonically coupled machine with seven times the number of poles employing the $7^{th}$ harmonic of the MMF distribution for the same number of coils as a two slots per-pole-per-phase design. This results in lower flux per pole, potentially by up to that ratio, and a corresponding reduction in rotor and stator back iron needed to carry EM flux. Also, this machine type is desirable for a segmented stator arrangement.

In the embodiments disclosed herein, a segmented stator assembly includes stator segments that provide for more cost effective shipping and installation while maintaining the strength and structural integrity of the large assemblies to achieve desired performance requirements. The stator segments can be of a size that can be shipped in industry standard shipping containers, thereby reducing the cost of shipping.

The electric machines discussed herein may be well suited for wind turbine applications. However, such machines may be employed in a variety of other applications.

While the invention has been described in terms of various specific embodiments, those skilled in the art will recognize that the invention can be practiced with modification within the spirit and scope of the claims.

What is claimed is:

1. A stator assembly, comprising:
a segmented stator having stator portions, wherein each stator portion comprises:
stator laminations;
end plates arranged axially on opposing sides of the stator portion;
structural plates, arranged interior to the end plates, each having a portion that is embedded within the stator laminations, wherein the portion of each of the structural plates comprises notch-like structures;
stabilizing elements coupling the end plates and the structural plates together; and
hanging members coupled to each of the structural plates to support the structural plates on the stabilizing elements; and
connectors to connect the stator portions of the segmented stator together.

2. The stator assembly of claim 1, wherein each of the structural plates and each of the hanging members comprises openings to receive securing members to secure the hanging members to the structural plates.

3. The stator assembly of claim 1, wherein each of the end plates comprises a portion having notch-like structures that is embedded within the stator laminations.

4. The stator assembly of claim 1, wherein the portion of each of the structural plates comprises openings to receive securing members respectively to secure the structural plates together.

5. The stator assembly of claim 1, wherein each of the stabilizing elements comprises a pipe.

6. The stator assembly of claim 1, wherein each of the connectors comprises splice plates arranged axially on either side of each of the end plates, the splice plates and the end plates comprising openings to accommodate securing elements, respectively, to secure the end plates of adjacent stator portions together.

7. The stator assembly of claim 6, wherein the connectors further comprise splice plates arranged axially on either side of each of the structural plates, the structural plates comprising openings to accommodate the securing elements, respectively, to secure the structural plates of adjacent stator portions together.

8. The stator assembly of claim 1, further comprising spacer plates having a portion embedded within the stator laminations, wherein the portion of each of the spacer plates and the portion of each of the structural plates comprises notch structures creating openings to allow a cooling medium to flow between the notch structures to provide radial cooling of the stator windings.

9. The stator assembly of claim 1, wherein the stator assembly is coupled to inner and outer covers via the end plates.

* * * * *